(12) United States Patent
Fogarty

(10) Patent No.: US 10,321,694 B2
(45) Date of Patent: *Jun. 18, 2019

(54) METHOD AND APPARATUS FOR REMOVING MEAT FROM CRUSTACEAN LEGS

(71) Applicant: Tim Fogarty, Moncton (CA)

(72) Inventor: Tim Fogarty, Moncton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,686

(22) Filed: Sep. 12, 2018

(65) Prior Publication Data

US 2019/0029278 A1 Jan. 31, 2019

Related U.S. Application Data

(63) Continuation-in-part of application No. 15/697,550, filed on Sep. 7, 2017, now Pat. No. 10,098,360.

(60) Provisional application No. 62/384,307, filed on Sep. 7, 2016.

(51) Int. Cl.
*A22C 29/00* (2006.01)
*A22C 29/02* (2006.01)
*A22C 17/00* (2006.01)

(52) U.S. Cl.
CPC .......... *A22C 29/023* (2013.01); *A22C 17/004* (2013.01); *A22C 29/025* (2013.01)

(58) Field of Classification Search
CPC ..... A22C 29/00; A22C 29/025; A22C 29/021; A22C 29/023; A22C 29/026; A22C 29/04
USPC ...................................................... 452/8–10
See application file for complete search history.

(56) References Cited

U.S. PATENT DOCUMENTS

| | | | | |
|---|---|---|---|---|
| 3,696,465 A | * | 10/1972 | Rossnan | A22C 29/025 452/8 |
| 3,758,921 A | * | 9/1973 | Ingalls | A22C 29/026 452/8 |
| 3,921,256 A | | 11/1975 | Huebotter | |
| 4,633,547 A | | 1/1987 | Caroon | |
| 4,715,093 A | | 12/1987 | Lapeyre | |
| 5,836,266 A | | 11/1998 | Watanabe | |
| 5,928,072 A | | 7/1999 | Fulcher | |
| 6,099,399 A | | 8/2000 | Hearn et al. | |
| 8,915,772 B2 | | 12/2014 | Zhou | |

* cited by examiner

*Primary Examiner* — Richard T Price, Jr.
(74) *Attorney, Agent, or Firm* — Bereskin & Parr LLP

(57) ABSTRACT

An apparatus for removing meat from crustacean legs includes a conveyor, and a plurality of leg meat extraction rollers. The conveyor has a plurality of leg slots arranged in a machine direction, each leg slot extending laterally in a cross-machine direction. The leg meat extraction rollers are positioned adjacent the conveyor laterally outwardly of the leg slots and oriented to receive crustacean legs moved laterally outwardly from the leg slots.

20 Claims, 33 Drawing Sheets

METHOD AND APPARATUS FOR REMOVING MEAT FROM CRUSTACEAN LEGS

FIELD

This disclosure relates to the field of methods and apparatus for removing meat from crustacean legs.

INTRODUCTION

Crustaceans, such as lobsters and crab for example, are commonly processed to remove meat from their shells. Such meat extraction can be performed by hand or by mechanical apparatus.

SUMMARY

In one aspect, a method of removing meat from crustacean legs is provided. The method comprises placing a crustacean on a conveyor, the crustacean having a plurality of crustacean legs extending from a crustacean body, the conveyor carrying the crustacean in a machine direction and the conveyor having a plurality of leg slots extending in a cross-machine direction; extending the crustacean legs outwardly from the crustacean body into the legs slots; and moving the crustacean legs along the legs slots into meat extraction rollers.

In another aspect, an apparatus for removing meat from crustacean legs is provided. The apparatus comprises a conveyor and a plurality of leg meat extraction rollers. The conveyor may have a crustacean body region flanked by laterally opposed crustacean leg regions. Each crustacean leg region may include a plurality of leg slots extending laterally outwardly of the crustacean body region. The plurality of leg meat extraction rollers may be positioned laterally outwardly of the leg slots and oriented to receive crustacean legs moved laterally outwardly from the leg slots.

In another aspect, a method of removing meat from crustacean legs is provided. The method comprises conveying a crustacean leg on a conveyor in a machine direction; and directing a flow of pressurized fluid in a cross-machine direction against the crustacean leg to move the crustacean leg outwardly in the cross-machine direction into engagement with meat extraction rollers.

In another aspect, an apparatus for removing meat from crustacean legs is provided. The apparatus comprises a conveyor sized to support a plurality of crustacean legs, a meat extraction roller positioned laterally outwardly of the conveyor, and a fluid nozzle positioned and oriented to direct a flow of pressurized fluid across the conveyor to carry a crustacean leg supported on the conveyor into engagement with the meat extraction roller.

In another aspect, a method of removing meat from crustacean legs is provided. The method comprises moving a crustacean leg into engagement with meat extraction rollers, the crustacean leg including leg meat and a shell; drawing the shell through the meat extraction rollers; and applying vacuum suction to the leg meat to resist movement of the leg meat through the meat extraction rollers with the shell.

In another aspect, an apparatus for removing meat from crustacean legs is provided. The apparatus comprises meat extraction rollers having a crustacean leg inlet and defining a downstream direction, and a suction conduit having an inlet end positioned upstream of the meat extraction rollers proximate the crustacean leg inlet, wherein the suction conduit is connectable with a suction source and is sized to receive crustacean leg meat.

In another aspect, a method of removing meat from crustacean legs is provided. The method comprises moving a crustacean leg into engagement with meat extraction rollers, the crustacean leg including leg meat and a shell; drawing the shell through the meat extraction rollers; and grasping the leg meat upstream of the meat extraction rollers using a mechanical gripper to resist movement of the leg meat through the meat extraction rollers with the shell.

In another aspect, an apparatus for removing meat from crustacean legs is provided. The apparatus comprises meat extraction rollers having an inlet path extending downstream to the meat extraction rollers, and a mechanical gripper located upstream of the meat extraction rollers. The mechanical gripper having at least two fingers. The mechanical gripper is being movable from an open position in which the fingers flank the inlet path, and a gripping position in which the fingers collectively grasp at the inlet path.

In another aspect, an apparatus for crustacean processing is provided. The apparatus includes a conveyor including first and second belts that travel in a machine direction. Each of the first and second belts having an inner lateral belt end, an outer lateral belt end, and a lateral belt width in a cross-machine direction from the inner lateral belt end to the outer lateral belt end. The first belt spaced apart from the second belt in the cross-machine direction, whereby the inner lateral belt ends of the first and second belts are spaced apart. At least one of (i) the first belt being biased in the cross-machine direction towards the second belt, and (ii) the second belt being biased in the cross-machine direction towards the first belt. Each of the first and second belts including a plurality of upstanding placement guides.

DRAWINGS

DESCRIPTION OF VARIOUS EMBODIMENTS

Figure 1:
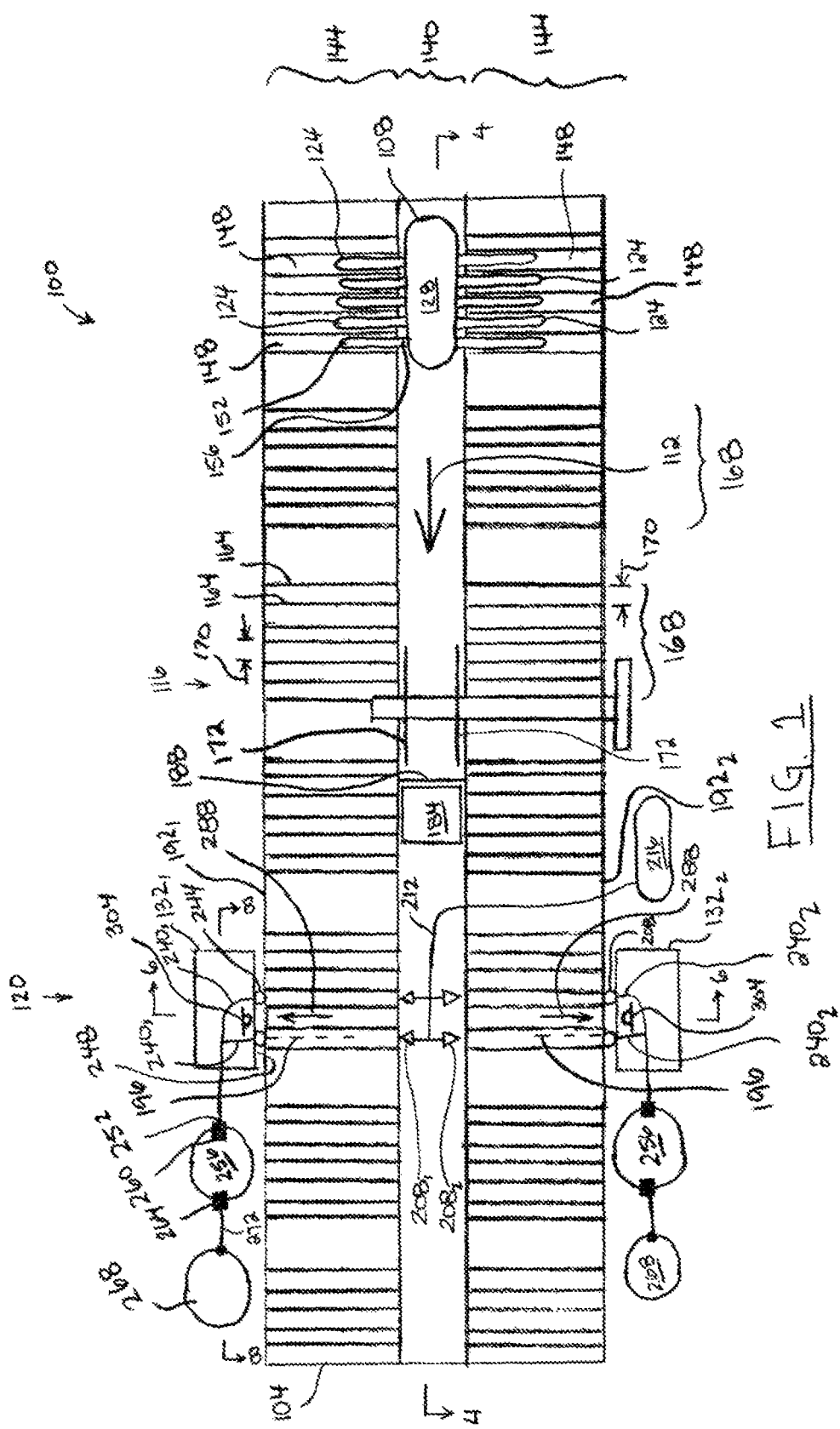
FIG. 1 is a schematic plan view of an apparatus for removing meat from crustacean legs, in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As used herein and in the claims, a first element is said to be "received" in a second element where at least a portion of the first element is received in the second element unless specifically stated otherwise.

In the drawings, where there are several instances of a part or element, a subset of those instances may be labelled with numbers to avoid cluttering the drawing.

Machine removal of crustacean meat can reduce labor costs and increase efficiency, however cleanly removing meat from the shell of some body parts, such as legs, has been challenging. A premium price can be obtained for large, intact pieces of crustacean meat. Therefore, it would be desirable to provide an apparatus that can remove meat from crustacean legs without mangling or shredding the meat, and to do so with high consistency.

Figure 2:
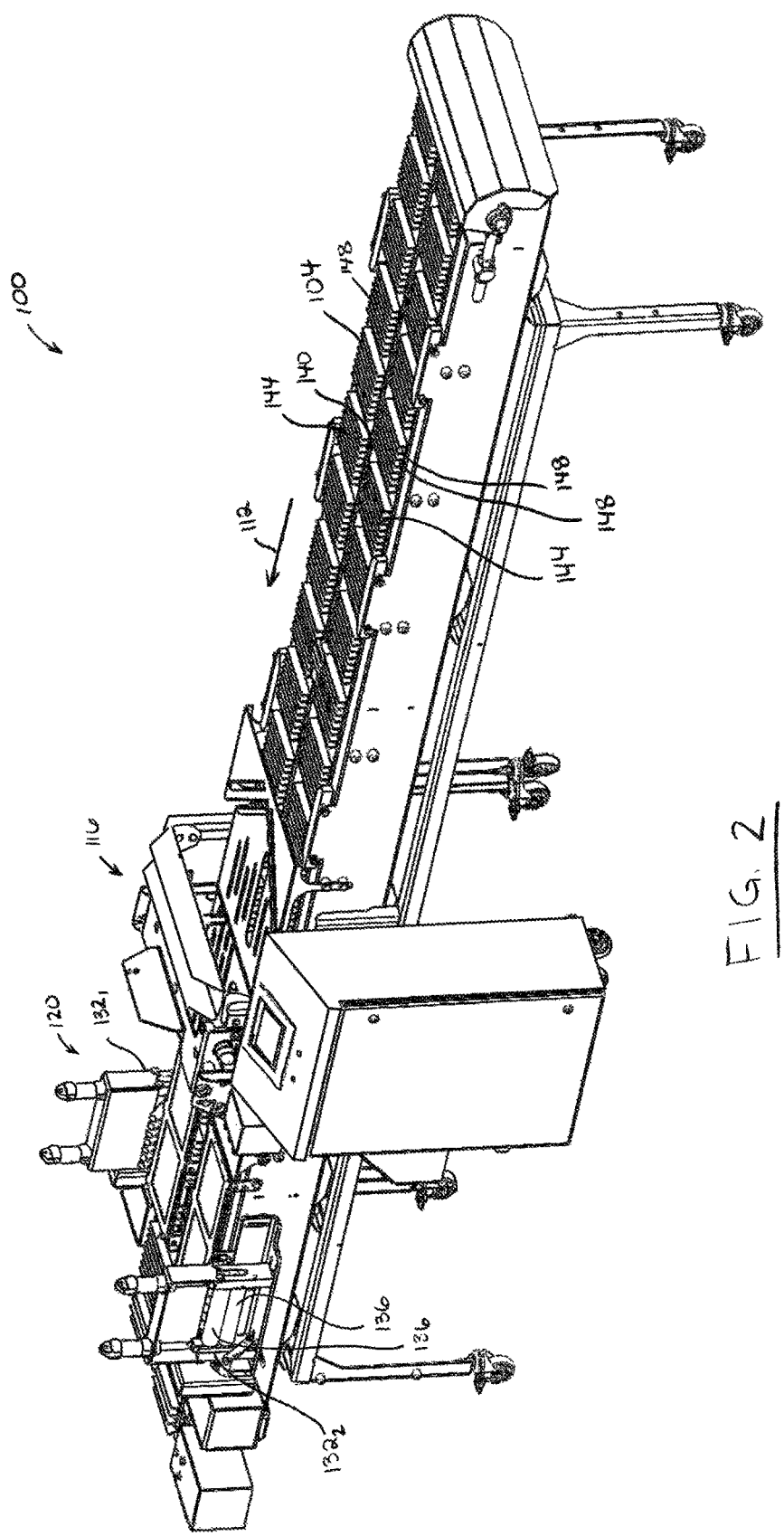
FIG. 2 is a perspective view of the apparatus of FIG. 1.

FIGS. 1-2 show an apparatus 100 for removing meat from crustacean legs. As shown, apparatus 100 includes a conveyor 104 for carrying a crustacean 108 in a machine direction 112 to cutting and meat extraction stations 116 and 120. At cutting station 116, crustacean legs 124 are severed from crustacean body 128. Conveyor 104 carries at least the severed legs in the machine direction 112 to meat extraction station 120 where the legs are moved into engagement with pairs $132_1$ and $132_2$ of meat extraction rollers 136. The meat extraction rollers $132_1$ and $132_2$ draw the shell of a crustacean leg 124 downstream through the rollers $132_1$ and $132_2$, which squeezes the meat inside the shell out through the severed proximal end of the crustacean leg 124. The squeezed out leg meat is collected.

Still referring to FIGS. 1-2, conveyor 104 may be a belt-type conveyor including a central body region 140 sized to accommodate a crustacean body 128, and two leg regions 144 positioned on opposite lateral sides of conveyor body region 140. Each leg region 144 includes a plurality of leg slots 148 which extend outwardly from the central body region 140 in a cross-machine (or "lateral") direction. Each leg slot 148 is sized to accommodate at least a crustacean leg 124.

Referring to FIG. 1, in use, a crustacean 108 is placed (e.g. by hand or by machine) onto conveyor 104 such that the crustacean body 128 is carried on conveyor body region 140, and the crustacean legs 124 extend laterally outwardly from crustacean body 128 into leg slots 148. As shown, each crustacean leg 124 may be received in a different one of leg slots 148.

In the meat extraction station, leg slots 148 align crustacean legs 124 with a downstream direction 288 through the meat extraction rollers 132. The leg slots 148 help straighten crustacean legs 124, which may have a natural inclination to curve. This helps with moving crustacean legs 124 axially through meat extraction rollers 132 beginning with the distal leg end 152 and ending with the severed proximal leg end 156. In turn, this allows the leg meat to be pushed out cleanly through the severed proximal leg end 156. In contrast, when a misaligned crustacean leg 124 is moved through meat extraction rollers 132, the leg meat will tend to rupture an exit opening in the shell and become shredded or mangled thereby destroying much of the value of the leg meat.

Figure 3:
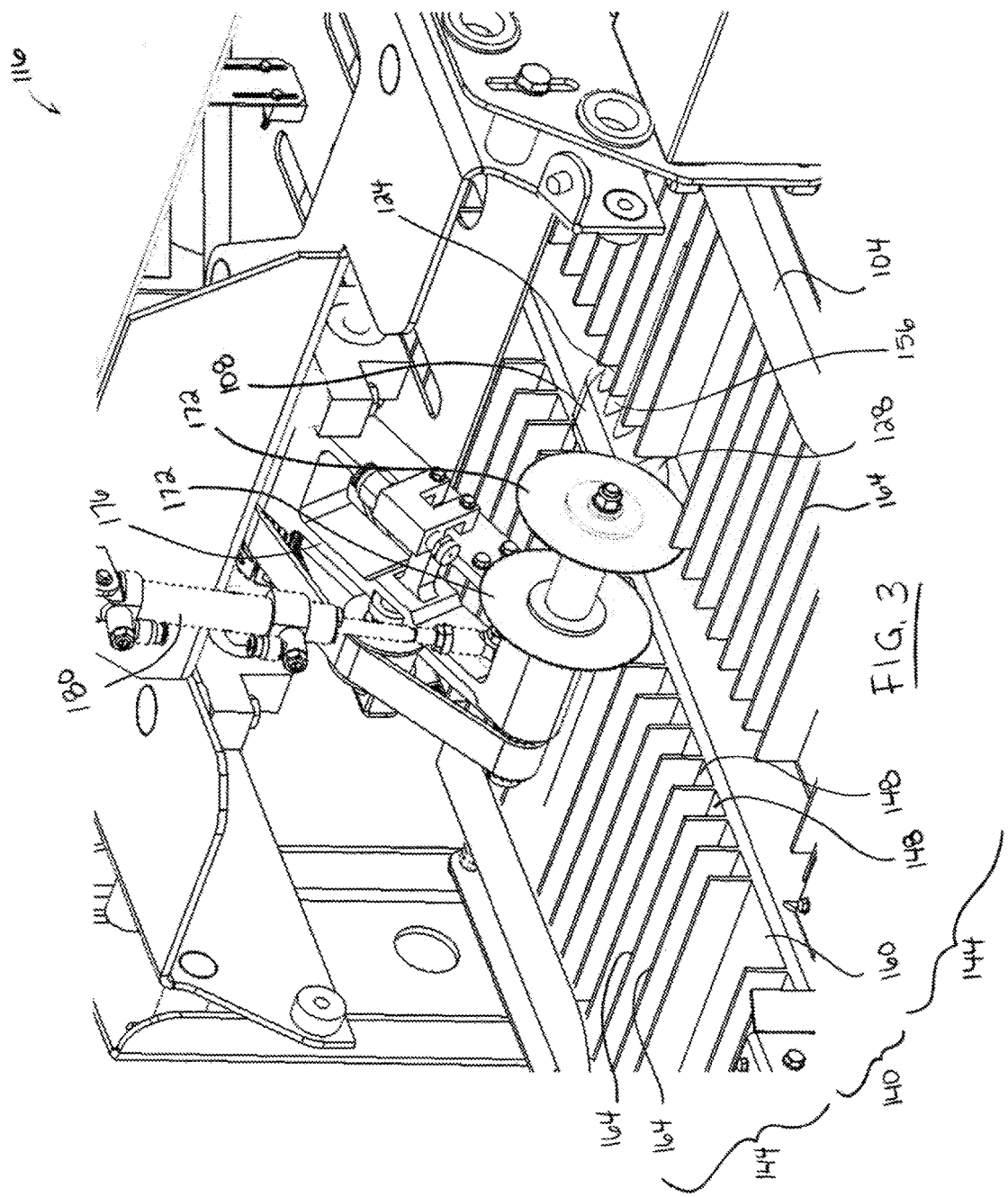
FIG. 3 is a perspective view of a cutting station of the apparatus of FIG. 1.

Referring to FIG. 3, conveyor leg slots 148 can be formed in any manner. In the illustrated example, conveyor 104 includes a floor 160 that supports a plurality of upstanding slot walls 164. As shown, leg slot walls 164 extend laterally outwardly across a conveyor leg region 144, and terminate at or laterally outboard of conveyor body region 140. In FIG. 1, leg slot walls 164 within a leg region 144 are shown spaced apart in the machine direction 112 to define leg slots 148 therebetween.

Still referring to FIG. 1, leg slots 148 may be arrayed continuously across the machine direction length of conveyor 104, or may be organized into spaced apart groups 168 of leg slots 148 as shown. Each leg slot group 168 may be configured to accommodate one crustacean 108. For example, a slot group 168 may include at least 5 leg slots in each conveyor leg region 144 for processing lobster or crab, which have 10 legs (or at least 4 leg slots in each conveyor leg region 144 where the front claws are removed). Leg slots 148 of the laterally opposed conveyor leg regions 144 may be laterally aligned, as shown, to receive crustacean legs 124 which are typically symmetrically arranged in a crustacean 108. Alternatively, one or more or all of leg slots 148 may be laterally misaligned as between the laterally opposed conveyor leg regions 144.

Conveyor leg slots 148 can have any machine-direction width 170 suitable to accommodate a crustacean leg 124. For example, leg slot width 170 may be between 0.1 and 1.5 inches, such as between 0.1 and 1.5 inches for crab or between 0.1 and 1 inches for lobster. In some embodiments, all conveyor leg slots 148 have the same leg slot width 170. This can allow crustacean legs 124 to be easily moved into leg slots 148 without having to register the machine-direction placement of legs 124 on conveyor 104. In other embodiments, conveyor 104 may include leg slots 148 having a plurality of different widths 170. For example, leg slots 148 may be sized and arranged on conveyor 104 according to the ordered sizing of crustacean legs 124 of a particular type of crustacean 108. This can allow leg slots 148 to provide a more tailored fit to the crustacean legs 124 of that crustacean 108 and thereby better align and straighten the crustacean legs 124 in the cross-machine direction.

Figure 4:
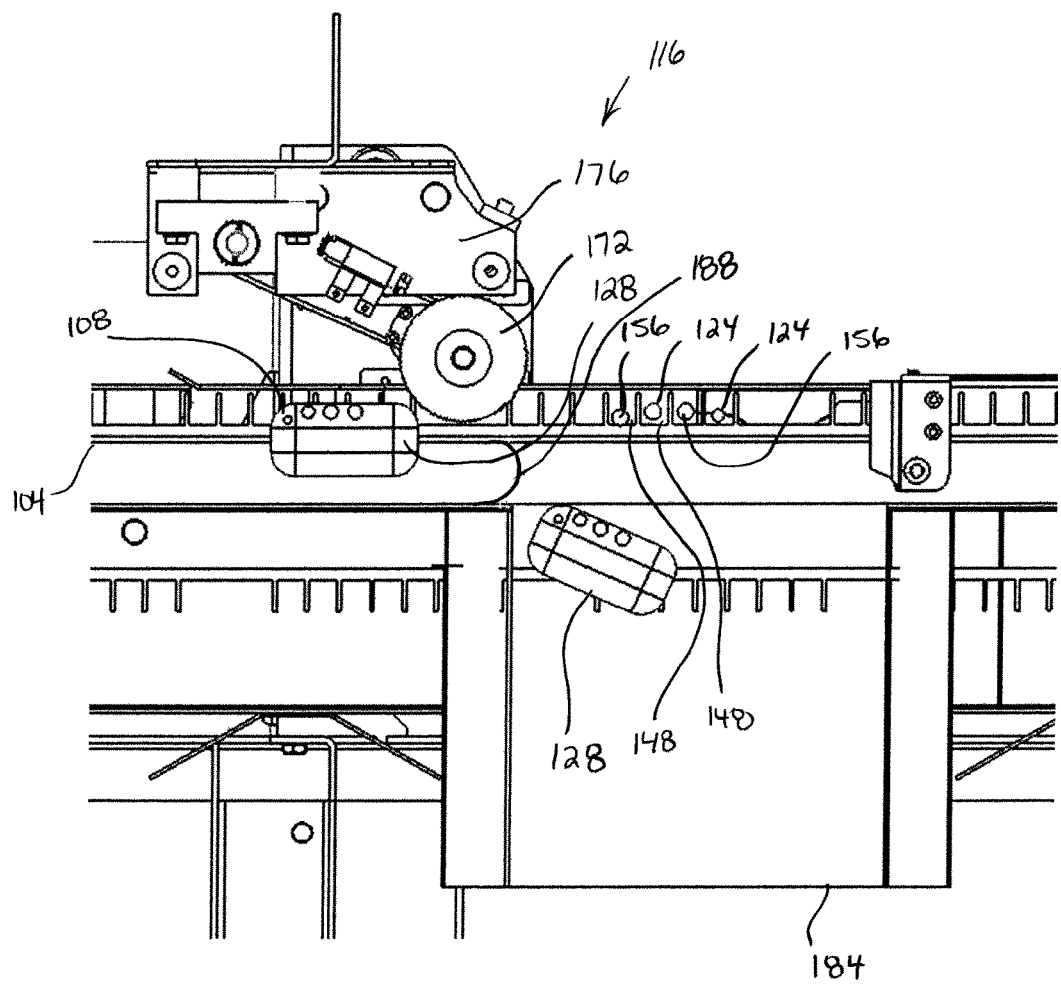
FIG. 4 is a cross-sectional view of the cutting station taken along line 4-4 in FIG. 1.

Conveyor 104 carries crustacean 108 downstream to cutting station 116 where legs 124 are severed from body 128. Referring to FIGS. 3 and 4, cutting station 116 is shown including cutting blades 172. Cutting blades 172 can have any configuration suitable for severing legs 124 from body 128. In the illustrated embodiments, cutting station 116 includes two cutting blades 172 positioned on laterally opposite ends of conveyor body region 140 for cutting through proximal leg ends 156. As shown, cutting blades 172 may be positioned laterally inboard of leg slot walls 164.

Cutting blades 172 can be positioned anywhere in the path of proximal leg ends 156 as conveyor 104 carries crustacean 108 in the machine direction. For example, cutting blades 172 may be positioned above conveyor 104 as shown, or extend through a slot in conveyor floor 160. In the illustrated embodiments, cutting blades 172 are mounted to a blade frame 176 above conveyor 104, which suspends cutting blades 172 just above conveyor floor 160. Optionally, cutting blades 172 may be vertically movable relative to conveyor 104 between a storage position and cutting position, or else have a fixed position relative to conveyor 104. In the illustrated embodiment, blade frame 176 is movable by actuation of a fluidic piston 180 (e.g. hydraulic or pneumatic).

Cutting blades 172 can be any type of cutting device suitable for severing legs 124 from body 128. For example, cutting blades 172 can be circular saw blades as shown, or reciprocating blades for example.

Referring to FIGS. 1 and 4, the conveyor body region 140 may end in the machine direction after cutting blades 172 as shown, or extend past meat extraction station 120. In the illustrated embodiment, conveyor body region 140 ends between cutting and meat extraction stations 116 and 120. A body collection receptacle 184 (e.g. a bucket, box, or tank) may be positioned below the machine direction end 188 of conveyor body region 140 to collect crustacean bodies 128, that fall from the conveyor body region end 188. In some embodiments, body collection receptacle 184 is a hopper or conduit that directs collected crustacean bodies 128 to another apparatus for further processing.

Figure 5:
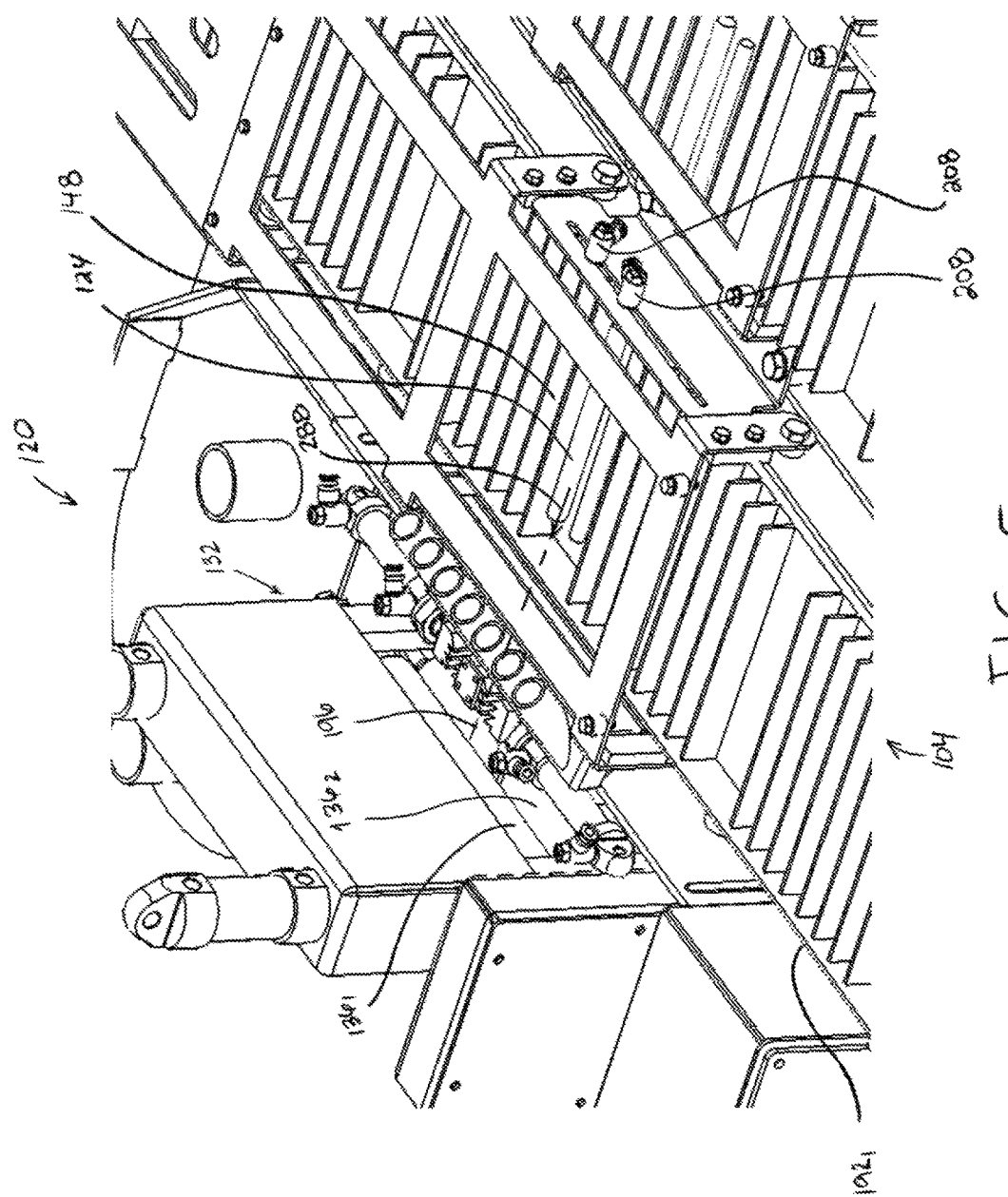
FIG. 5 is a partial perspective view of a meat extraction station of the apparatus of FIG. 1.

Referring to FIGS. 1 and 5, during and after cutting by cutting blades 172, crustacean legs 124 remain positioned in leg slots 148. Conveyor 104 carries the severed crustacean legs 124 in the machine direction to meat extraction station 120. As shown, meat extraction station 120 includes two pairs 132 of meat extraction rollers 136. Meat extraction rollers 132 are positioned outboard of opposite lateral ends 192 of conveyor 104 to receive crustacean legs 124. As shown, each roller pair 132 can include an upper roller $136_1$ and a lower roller $136_2$ that together define an inlet path 196 that extends in a downstream direction 288 between the rollers 136. In the illustrated example, rollers 136 are oriented in the machine direction so that the inlet path 196 extends downstream in the cross-machine direction.

Figure 7:
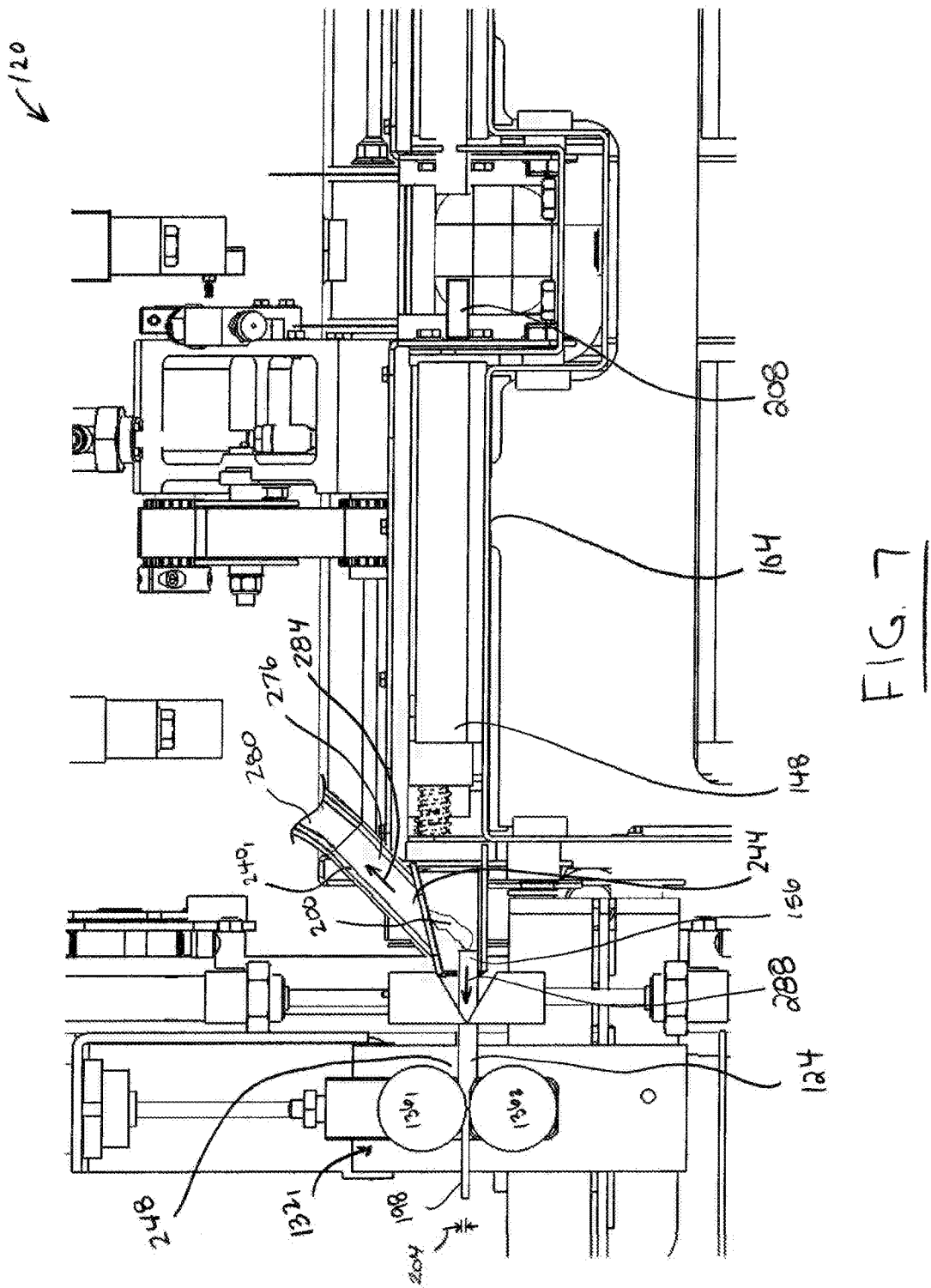
FIG. 7 is a partial cross-sectional view of the meat extraction station taken along line 6-6 in FIG. 1, and showing leg meat being extracted from a leg shell.

In use, conveyor 104 carries a severed crustacean leg 124 into the meat extraction station 120 where the crustacean leg 124 aligns with a roller pair 132. The crustacean leg 124 is then moved laterally outwardly along the conveyor leg slot 148 in which it is situated and along the roller inlet path 196 into engagement with the roller pair 132. The leg distal end makes first engagement with the rollers 132. As shown in FIG. 7, the leg shell 198 is drawn downstream through the rollers 132 (i.e. between the rollers 136 of the pair 132), and leg meat 200 is squeezed out through the severed proximal leg end 156.

Crustacean legs 124 can be moved along conveyor leg slots 148 into engagement with rollers 132 in any manner. For example, crustacean legs 124 may be moved into engagement with rollers 132 by gravity (e.g. by tilting conveyor 104), manually (e.g. by hand), or by fluid pressure.

Gravitational movement of crustacean legs 124 can provide motive force without additional equipment. However, as gravity moves crustacean legs 124 with relatively little force, a larger gap 204 between rollers 136 of the pair 132 may be required to obtain engagement (i.e. for the rollers to "bite"). Undesirably, a larger gap 204 (e.g. exceeding 0.5 inches) may allow some smaller crustacean legs 124 to pass through the rollers 132 whole without extracting any meat.

Manual movement of crustacean legs 124 can allow human actors to apply the requisite force when moving crustacean legs 124 by hand into engagement with rollers 132. This can allow gap 204 between rollers 132 to be reduced or eliminated. However, the use of human actors increases the labor operating costs of apparatus 100, and introduces safety concerns associated with fingers near rollers 132.

Figure 6:
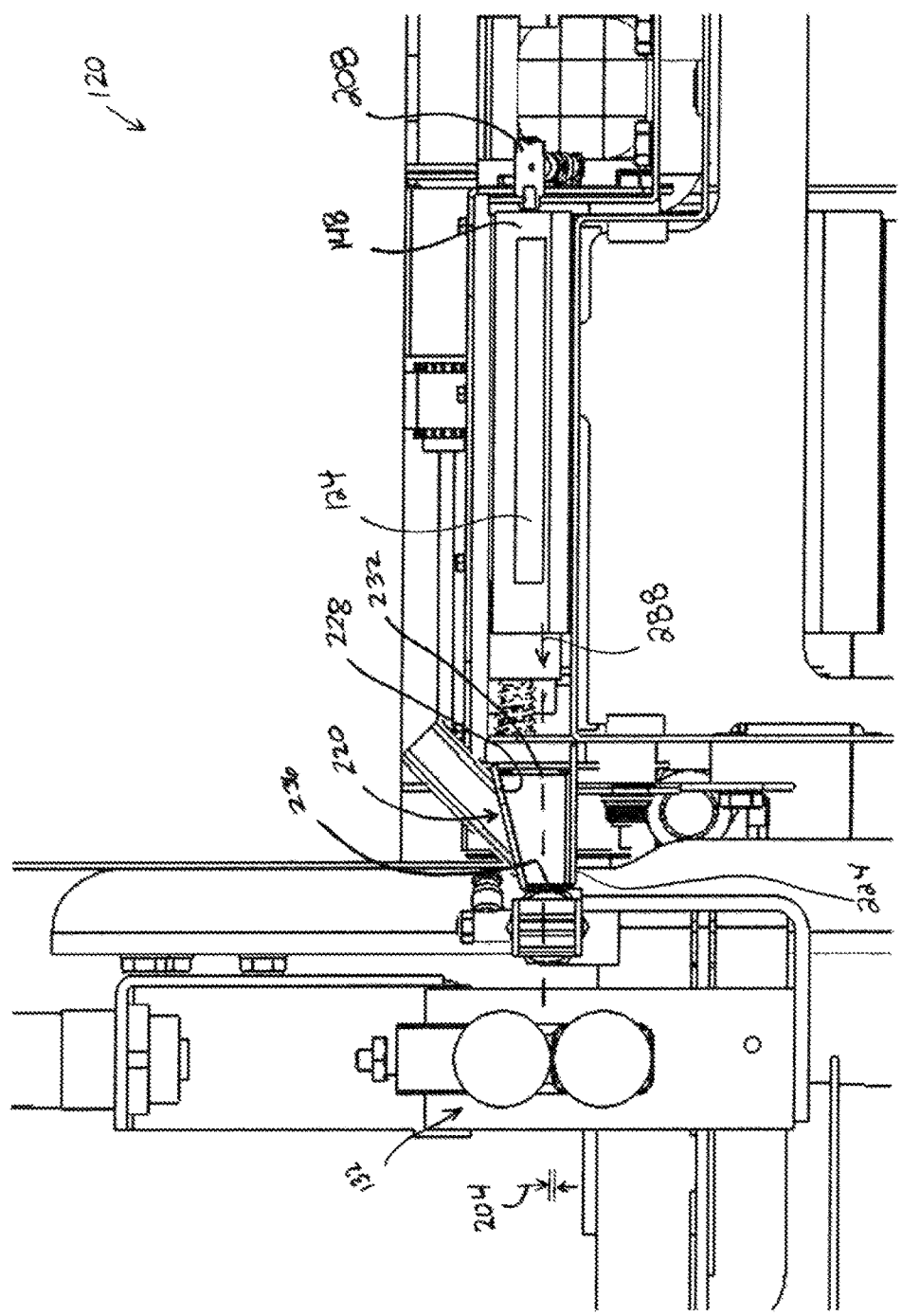
FIG. 6 is a partial cross-sectional view of the meat extraction station taken along line 6-6 in FIG. 1.

Turning to FIGS. 5-7, in the illustrated example, crustacean legs 124 are moved into engagement with rollers 132 by fluid pressure. The fluid pressure can apply sufficient force to avoid the need for a large roller gap 204 which could let smaller legs 124 through whole, and avoids the labor costs associated with manual leg movement. As exemplified, meat extraction station 120 includes a plurality of fluid nozzles 208 oriented to direct pressurized fluid laterally outwardly against a crustacean leg 124 in a leg slot 148 to move the crustacean leg 124 laterally outwardly along the leg slot 148 into engagement with meat extraction rollers 132. The force of the fluid pressure can allow roller gap 204 to be reduced or substantially eliminated. For example, roller gap 204 may be less than 0.5 inches (e.g. 0 inches, or 0 to 0.5 inches), which can help prevent small legs from passing through rollers 132 whole.

Referring to FIG. 1, meat extraction station 120 can include any number of fluid nozzles. In the illustrated example, meat extraction station 120 includes four fluid nozzles, with two fluid nozzles $208_1$ facing outwardly towards conveyor lateral end $192_1$ and roller pair $132_1$, and two fluid nozzles $208_2$ facing in an opposite direction towards conveyor lateral end $192_2$ and roller pair $132_2$. As shown, fluid nozzles $208_1$ and $208_2$ may be positioned laterally inboard of conveyor leg regions 144. This allows fluid nozzles $208_1$ and $208_2$ to direct pressurized fluid against proximal leg end 156. For example, fluid nozzles $208_1$ and $208_2$ may be positioned in the space between conveyor leg regions 144 made available after conveyor body region end 188 as shown, or may be positioned between conveyor body and leg regions 140 and 144.

Fluid nozzles 208 can emit any fluid suitable for moving crustacean legs 124 into engagement with meat extraction rollers 132. For example, fluid nozzles 208 may emit a liquid (e.g. water), a gas (e.g. air), or both. As shown, fluid nozzles 208 may be connected by fluid lines 212 to a pressurized fluid source 216. Fluid source 216 can be any source of pressurized fluid, such as a gas compressor, liquid pump, a compressed fluid tank, or a municipal water supply line for example. All fluid nozzles 208 may be connected to the same fluid source 216 as shown, or one or more (or all) fluid nozzles 208 may be connected to different fluid sources.

Referring to FIG. 6, in some embodiments, a funnel 220 is positioned between conveyor leg slots 148 and rollers 132 to help better align crustacean leg 124 when moved into engagement with rollers 132. In the illustrated example, funnel 220 includes a funnel lower wall 224 and a funnel upper wall 228 that together define a funnel inlet end 232 proximate conveyor slot 148, and a funnel outlet end 236 proximate rollers 132 outboard of funnel inlet end 232. As shown, funnel upper wall 228 may be angled downwardly toward funnel lower wall 224 in an outward direction towards rollers 132 in alignment with roller inlet path 196. This can allow funnel 220 to urge crustacean legs 124 to flatten and straighten as the legs 124 are moved into engagement with meat extraction rollers 132.

Referring to FIG. 7, leg meat 200 that is squeezed out of a leg shell 198 by meat extraction rollers 132 can be removed and collected in any manner. For example, the leg meat 200 can be manually removed by grasping the meat by hand and depositing the leg meat 200 into a collection bin. However, this adds labor costs and there are safety issues associated with fingers being near the operating extraction rollers 132. In the illustrated example, leg meat 200 is pulled away from leg shell 198 by vacuum suction. This allows leg meat 200 to be withdrawn by machine, which saves on labor costs, improves safety, and can increase productivity.

Figure 8:
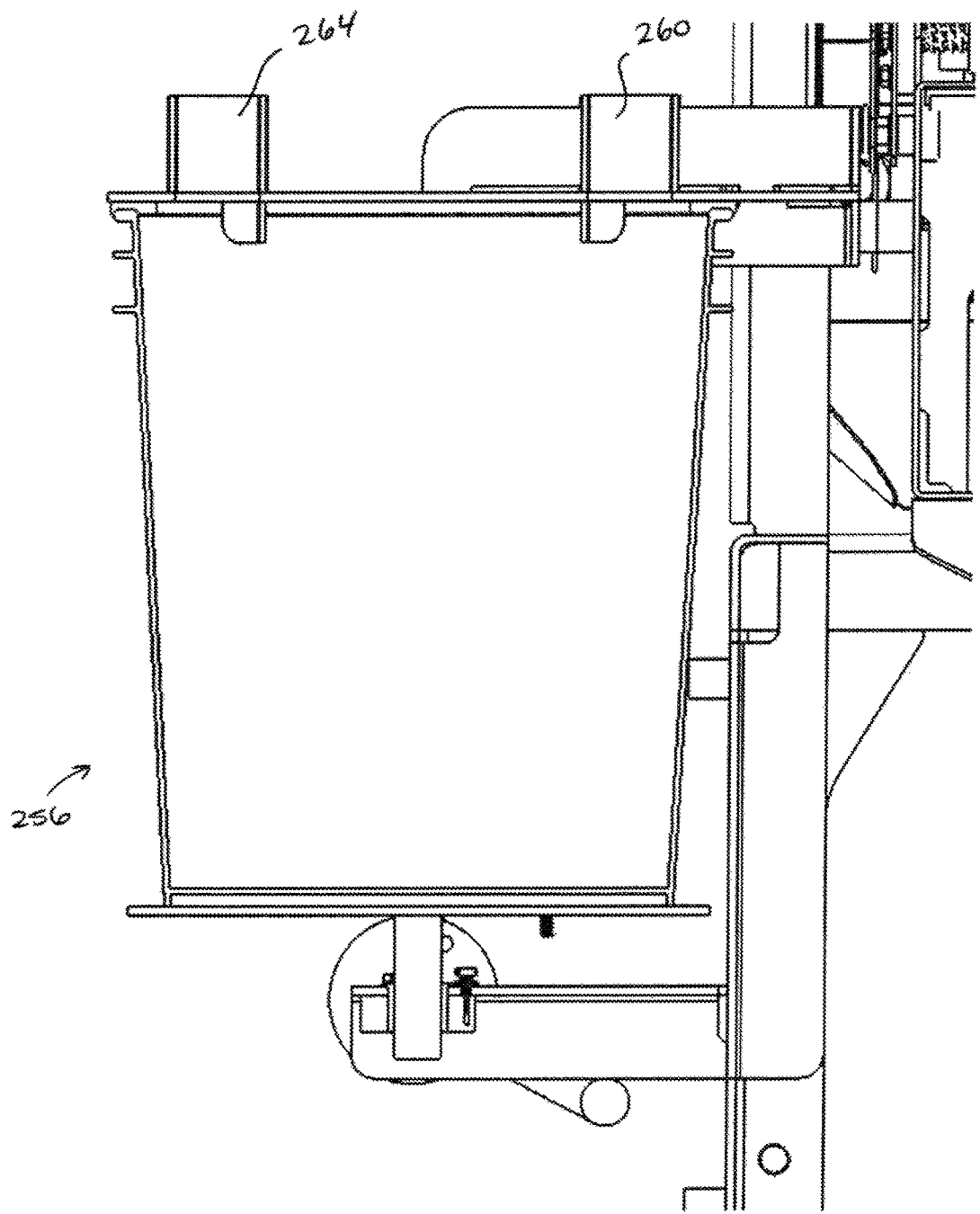
FIG. 8 is a cross-sectional view of a leg meat collection receptacle taken along line 8-8 in FIG. 1.

Referring to FIGS. 1 and 7, meat extraction station 120 is shown including a suction conduit $240_1$ having a suction conduit inlet end 244 positioned upstream of meat extraction rollers $132_1$ proximate roller leg inlet 248 to suction extracted leg meat 200. Suction conduit $240_1$ also includes a suction conduit outlet end 252 fluidly connected to a leg meat collection receptacle 256. Turning to FIGS. 1 and 8, leg meat collection receptacle 256 may include an inlet port 260 that connects to suction conduit outlet end 252 for receiving suctioned leg meat, and an outlet port 264 fluidly coupled to a suction source 268 (e.g. air pump). Outlet port 264 may be fluidly coupled to suction source 268 in any manner, such as by gas line 272.

Referring again to FIG. 7, suction conduit $240_1$ may include an inlet nozzle 276 (FIG. 7) connected to a gas line 280 (FIG. 1). Meat extraction station 120 can include any number of suction conduits. In the example of FIG. 1, meat extraction station 120 includes two suction conduits $240_1$ associated with meat extraction rollers $132_1$ and two suction conduits $240_2$ associated with meat extraction rollers $132_2$. This can allow meat extraction station 120 to extract meat from multiple crustacean legs 124 simultaneously. As shown, suction conduits $240_1$ and $240_2$ may include associated fluid nozzles 208 positioned to apply suction proximate to where crustacean legs 124 engage meat extraction rollers $132_1$ and $132_2$ (and hence where leg meat will be squeezed out of the crustacean legs 124).

Referring to FIG. 7, suction conduit inlet end 244 can define any suction direction 284 suitable for pulling leg meat 200 from leg shells 198. In the illustrated example, suction direction 284 includes a laterally inwardly direction component that is opposed to the downstream direction 288 of rollers 132. This allows the suction from conduit 240 to pull leg meat 200 away from the leg shell 198 which is being drawn in the downstream direction 288 through rollers 132.

Apparatus 100 can include any number of leg meat collection receptacles 256 and suction sources 268. FIG. 1 shows an example including a different leg meat collection receptacle 256 and suction source 268 associated with each meat extraction roller pair 132. In alternative embodiments, apparatus 100 includes just one leg meat collection receptacle 256 and one suction source 268. In this case, all leg meat extracted at both roller pairs 132 may be deposited into the same receptacle 256 by suction developed by the same suction source 268.

Figure 9:
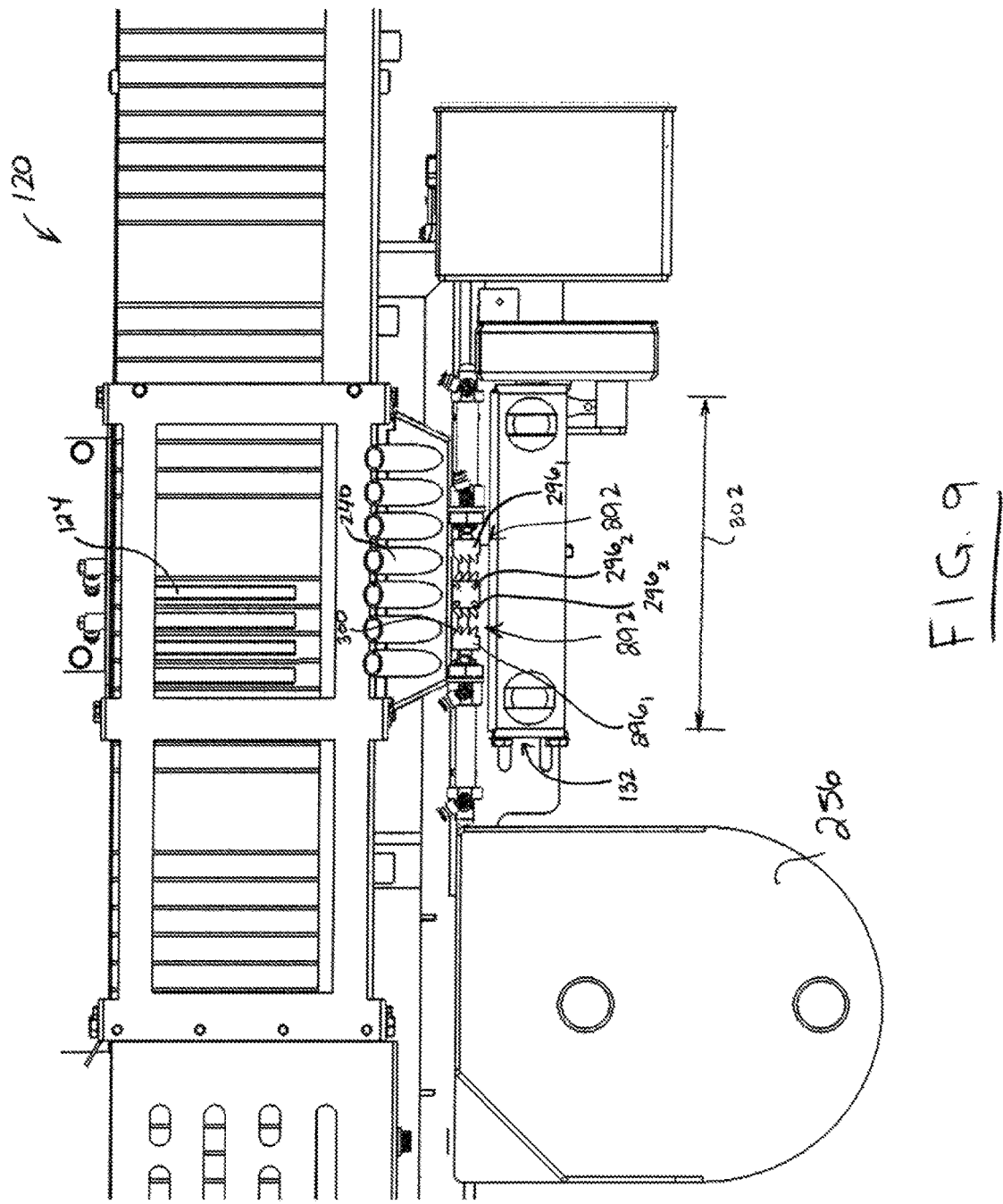
FIG. 9 is a partial top plan view of the meat extraction station of the apparatus of FIG. 1.

Reference is now made to FIG. 9. The leg meat of some crustacean legs 124 can be more difficult to remove from the leg shell. For example, leg meat from cooked crustacean legs 124 can be strongly bonded to the leg shell. In some embodiments, apparatus 100 includes one or more mechanical grippers 292 that grasp (e.g. close in on, like a vice) leg meat as it is squeezed out of the leg shell to supplement or substitute the vacuum suction force.

As exemplified, each mechanical gripper 292 includes at least two gripper fingers 296, which are collectively movable from an open position in which the fingers flank the roller inlet path 196 to a closed position in which the fingers collectively grasp at the inlet path 196 where leg meat is squeezed out. Gripper fingers 296 can have any structure and material composition suitable for grasping leg meat. In the illustrated example, gripper fingers 296 have jagged engagement faces 300 that can improve grip. Gripper fingers 296 may be made of a resiliently deformable material such as rubber, which can help avoid damaging the leg meat.

Gripper fingers 296 can be actuated in any manner. In the illustrated example, each mechanical gripper 292 includes a stationary gripper finger $296_1$ and a movable gripper finger $296_2$. The movable gripper finger $296_2$ is shown connected to a fluidic piston (e.g. pneumatic or hydraulic) which can be selectively activated to move the gripper finger $296_2$ towards the stationary gripper finger $296_1$ from the open position to the gripping position. In the open position, gripper fingers $296_1$ and $296_2$ are spaced apart by a distance sufficient to allow a crustacean leg 124 to move downstream into engagement with rollers 132. In the closed position, gripper fingers $296_1$ and $296_2$ close in on the crustacean leg to contact and grasp the leg meat, whereby the gripper fingers $296_1$ and $296_2$ resist downstream movement of the leg meat as the leg shell is pulled downstream through the rollers 132.

Mechanical grippers 292 can have any orientation. In the illustrated example, gripper fingers $296_1$ and $296_2$ are horizontally spaced apart and aligned, and collectively move horizontally from the open position to the gripping position. This can help prevent gripper fingers $296_1$ and $296_2$ from blocking the airflow path of the suction nozzles. In alternative embodiment, gripper fingers $296_1$ and $296_2$ may be vertically spaced apart and aligned, and collectively move vertically from the open position to the gripping position. This can allow for a more compact arrangement of gripper fingers $296_1$ and $296_2$ whereby a greater number of mechanical grippers 292 can be positioned along the roller width 302 of meat extraction rollers 132.

Referring to FIGS. 1 and 9, apparatus 100 may include one or more sensors 304 (FIG. 1) that detect when a crustacean leg 124 is moved towards engagement with meat extraction rollers 132. Sensor 304 (FIG. 1) can be any type of sensor suitable for such detection, such as an infrared or laser beam break sensor for example. Mechanical grippers 292 (FIG. 9) may be communicatively coupled to sensors 304 (FIG. 1). For example, mechanical grippers 292 (FIG. 9) may be configured to move from the open position to the gripping position in response to sensor 304 (FIG. 1) detecting a crustacean leg 124 moving towards engagement with meat extraction rollers 132. In some embodiments, mechanical grippers 292 (FIG. 9) may activate to move to the gripping position after a predetermined time delay following a detection from sensor 304 (FIG. 1). In some embodiments, mechanical grippers 292 (FIG. 9) may deactivate (i.e. move to the open position) after sensor 304 (FIG. 1) (or another sensor) detects that the leg shell has been pulled through the rollers 132 or after a predetermined time following activation of the mechanical gripper 292 (FIG. 9). This can allow vacuum suction from suction conduit 240 to carry the extracted leg meat away to leg meat collection receptacle 256.

Figure 10:
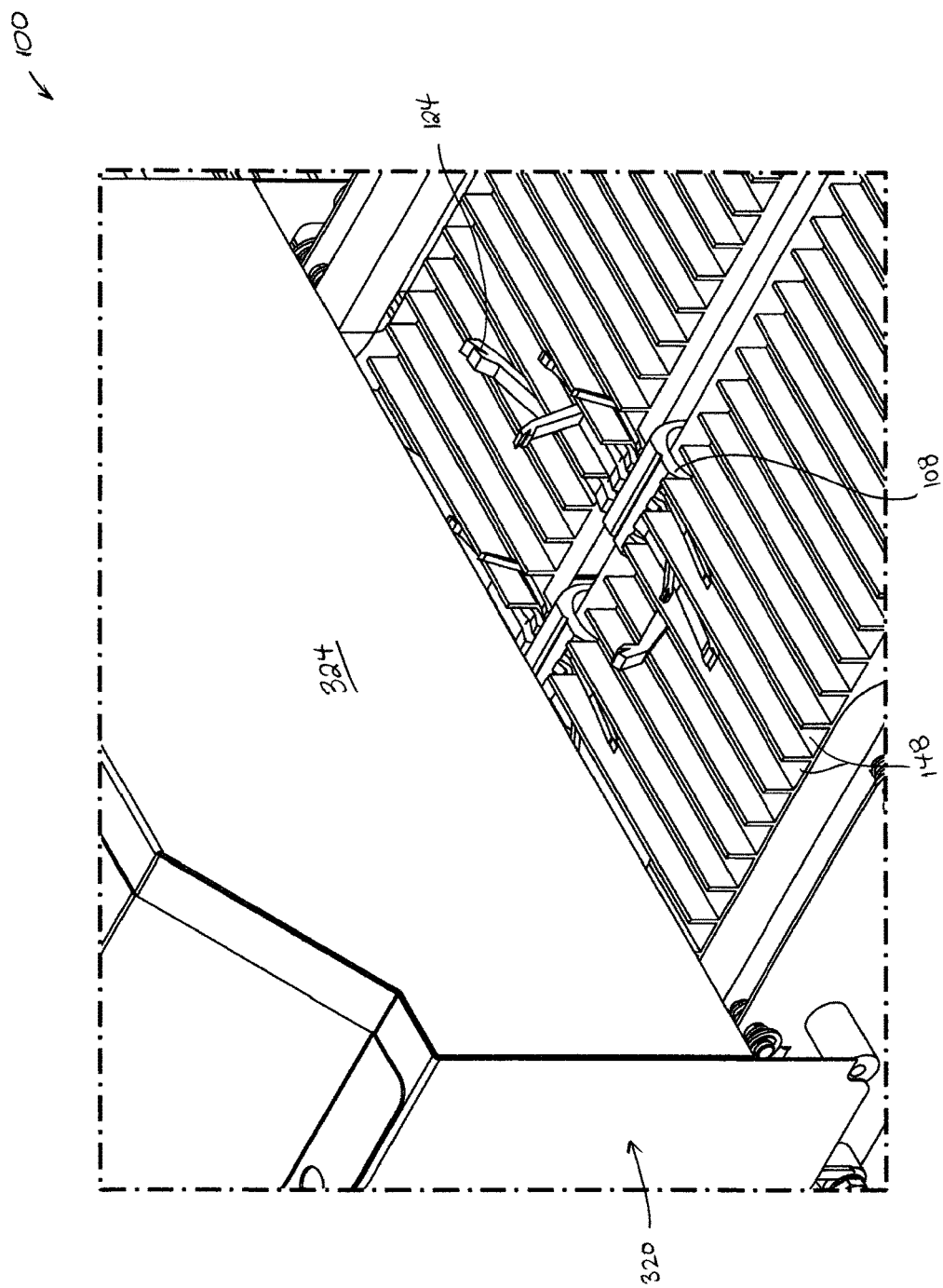
FIG. 10 is a perspective view of a leg straightening station of an apparatus in accordance with another embodiment.
Figure 11:
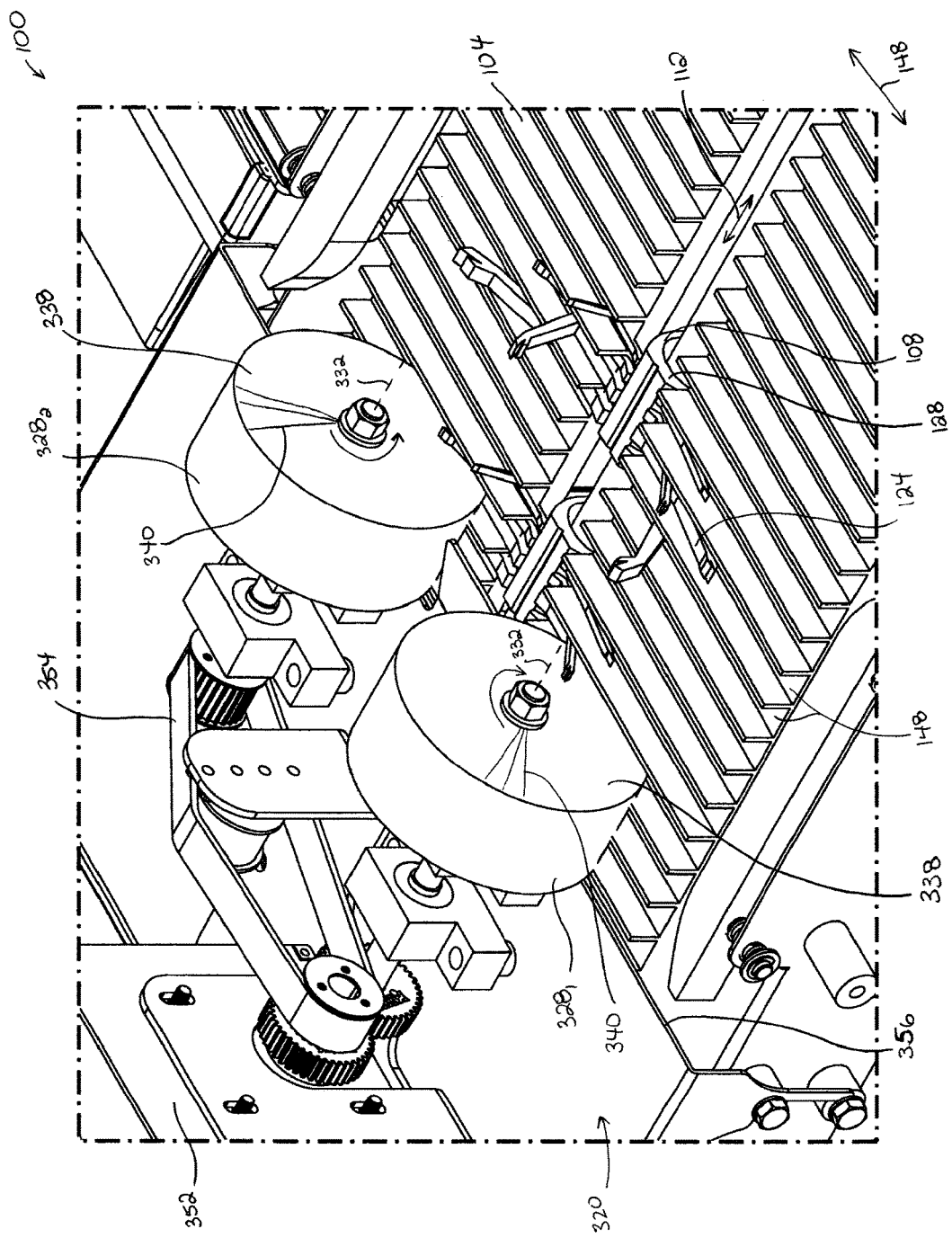
FIG. 11 is the perspective view of the leg straightening station of FIG. 10 with a cover removed.
Figure 12:
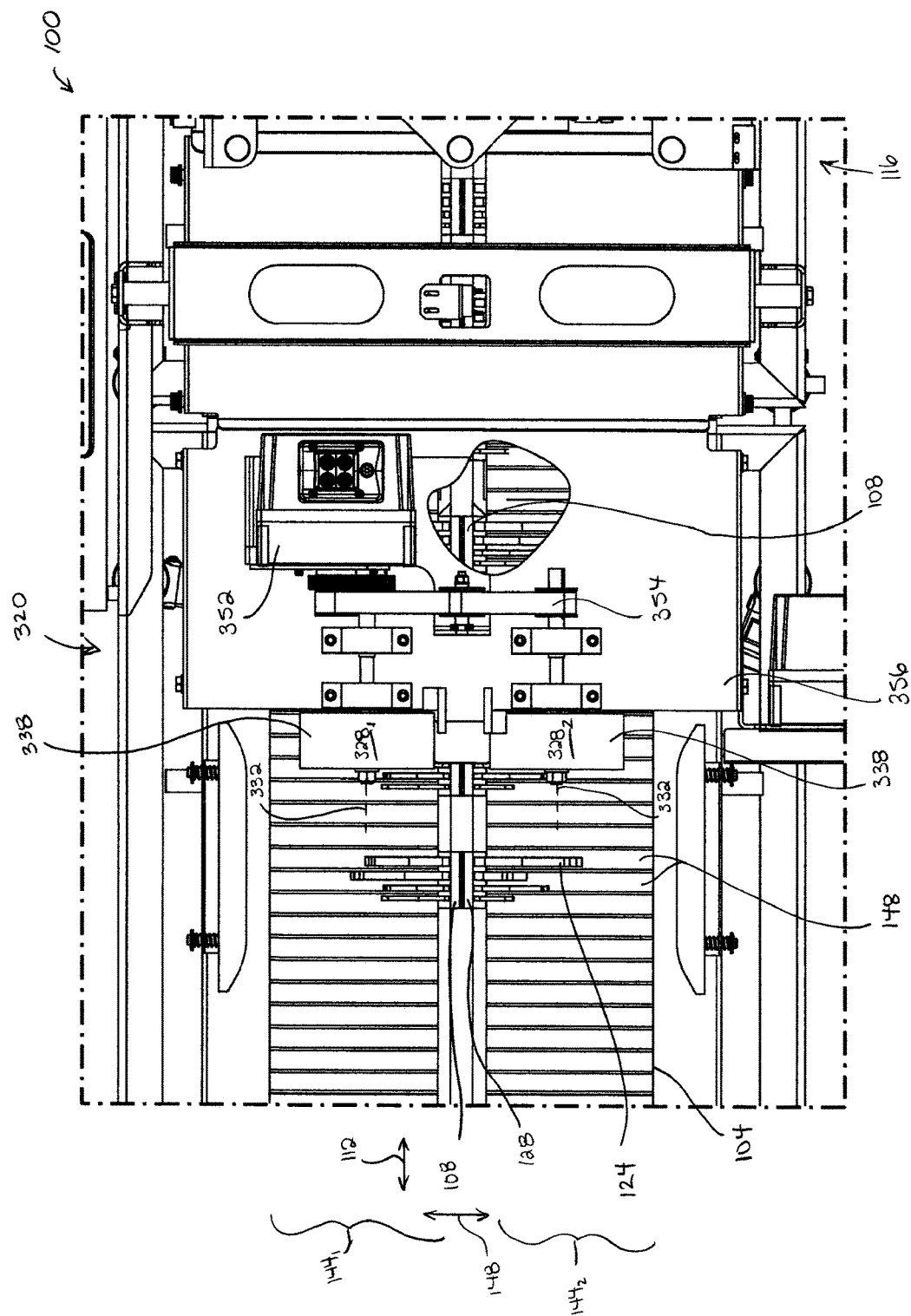
FIG. 12 is a top plan view of the leg straightening station of FIG. 10 with the cover removed.

Referring to FIGS. 10-12, apparatus 100 is shown in accordance with another embodiment. As shown, apparatus 100 may include a leg straightening station 320 positioned upstream of the leg cutting and meat extraction stations 116 and 120 (FIG. 1). Crustacean legs 124 of pre-cooked (i.e. partially or fully cooked) crustaceans 108 may tend to curl. In some cases, it may be problematic to properly feed curled crustacean legs 124 into meat extraction rollers. At leg straightening station 320, crustacean legs 124 are straightened (e.g. at least partially uncurled) to extend more completely within conveyor leg slots 148. The straightened conveyor legs 124 may be more successfully moved axially through meat extraction rollers, which may result in greater meat extraction efficiency.

FIGS. 11 and 12 show leg straightening station 320 (FIG. 10) with cover 324 removed so that the internal components can be seen. As shown, leg straightening station 320 may include a plurality of brush rollers 328. Each brush roller 328 is positioned to brush into conveyor leg slot 148 outwardly in cross-machine (i.e. lateral) direction 114. For example, each brush roller 328 may have a rotation axis 332 that is within a plane defined by machine direction 112 and vertical direction 336, and transverse to the vertical direction 336. In the illustrated example, rotation axes 332 are substantially parallel to the machine direction 112. This allows brush roller 328 to brush through conveyor leg slots 148 over crustacean legs 124 in a cross-machine direction 114 as opposed to in a machine direction 112. Consequently, brush roller 328 is able to push crustacean legs 124 laterally outwardly of crustacean body 128, and thereby straighten crustacean legs 124 to extend more completely within conveyor leg slots 148.

Leg straightening station 320 may include any number of brush rollers 328. In the example shown, leg straightening station includes two brush rollers 328 positioned to engage the conveyor leg slots 148 of different respective conveyor leg regions 144. In other embodiments, leg straightening station 320 may include a plurality of brush rollers 328 over each conveyor leg region 144.

Brush rollers 328 can have bodies 338 with any composition that allows brush rollers 328 to straighten crustacean legs 124 against their compulsion to curl, and which does not unduly obstruct machine-direction movement of conveyor 104 as leg slot walls 164 move through brush rollers 328. Brush roller bodies 338 may include any one or more of bristles (soft and/or rigid), foam, and paddles (soft and/or rigid) for example. In the illustrated example, each brush roller body 338 include at least bristles 340 (for ease of illustration, only a few discrete bristles are shown).

Brush rollers 328 may be rotated in any direction that allows brush roller bodies 338 to urge crustacean legs 124 to uncurl laterally outwardly of crustacean body 128. The brush roller(s) $328_1$ that engage conveyor leg region $144_1$ may be rotated in an opposite direction to brush roller(s) $328_2$ that engage conveyor leg region $144_2$. This allows the brush rollers $328_1$ and $328_2$ to all urge crustacean legs 124 to uncurl laterally outwardly of crustacean body 128. As shown, when viewed in a downstream direction, the brush roller(s) $328_1$ over the left conveyor leg region $144_1$ may rotate in a clockwise direction 344, and the brush roller(s) $328_2$ over the right conveyor leg region $144_2$ may rotate in a counterclockwise direction 348.

Brush rollers 328 may be driven to rotate in any manner. In the illustrated embodiment, brush rollers 328 are driven by a common motor 352. The opposite rotating directions are provided by reversing transmission 354. In other embodiments, brush rollers 328 may be separately driven by different motors.

Figure 13:
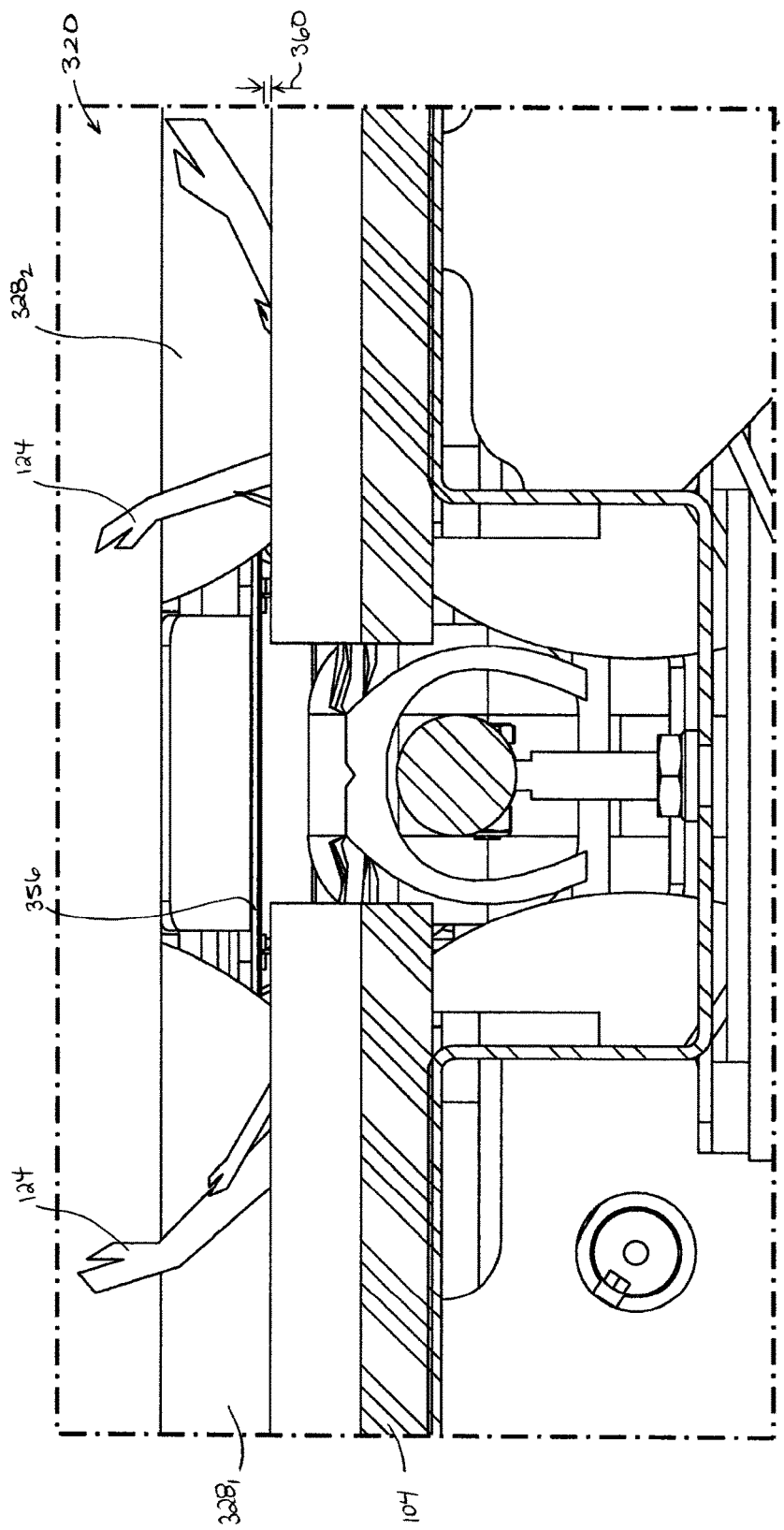
FIG. 13 is a front elevation view of the leg straightening station of FIG. 10.

Referring to FIGS. 11-13, leg straightening station 320 may further include an upper retaining wall 356 that acts to maintain the leg straightening imparted by the brush rollers 328. As shown, retaining wall 356 may extend in a downstream direction from proximate leg brush rollers 328. Retaining wall 356 may extend proximate to conveyor 104, to inhibit crustacean legs 124 from restoring their curled configuration after being straightened by brush rollers 328.

In some embodiments, distance 360 between conveyor 104 and retaining wall 356 may be less than 1 cm (e.g. 0 cm to 1 cm).

In some embodiments, retaining wall 356 may extend downstream over cutting station 116 and meat extraction station 120 to maintain the straightened state of crustacean legs 124. FIG. 12 shows a partial cutaway through retaining wall 356 to show crustacean 108 below.

Figure 14:
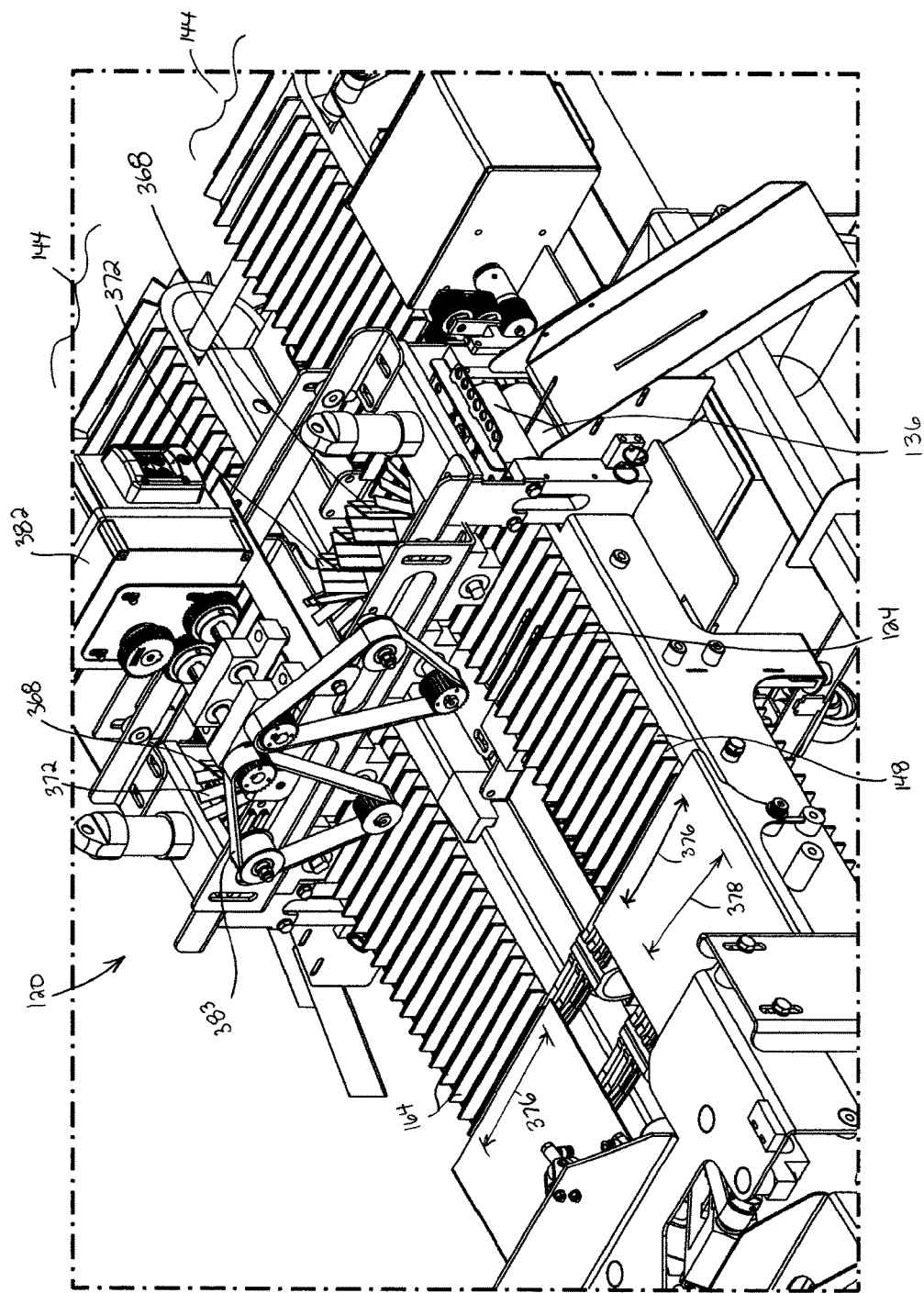
FIG. 14 is a front perspective view of a meat extraction station in accordance with an embodiment.
Figure 15:
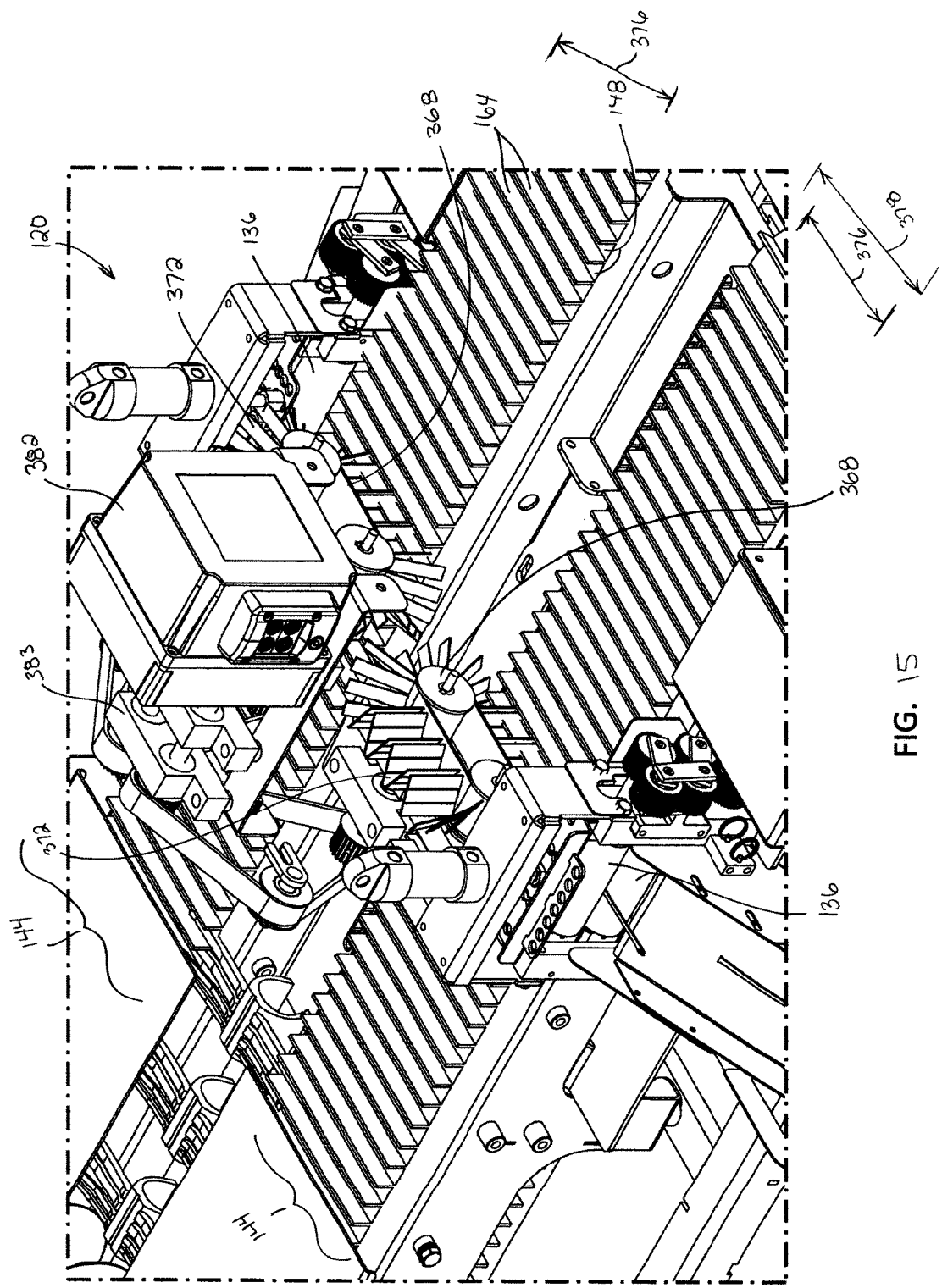
FIG. 15 is a rear perspective view of the meat extraction station of FIG. 14.

Reference is now made to FIGS. 14-15, which show a meat extraction station 120 in accordance with another embodiment. As shown, meat extraction station 120 may include one or more ejection conveyors 368 that act to convey dismembered crustacean legs 124 into engagement with meat extraction rollers 136. Each ejection conveyor 368 may include a plurality of conveyor projections 372 that move into and laterally outwardly along conveyor leg slots 148 to urge crustacean legs 124 positioned therein to move laterally outwardly into engagement with meat extraction rollers 136. As shown, ejection conveyors 368 may be positioned above conveyor 104.

Meat extraction station 120 can include any number of ejection conveyors 368. For example, meat extraction station 120 may include one ejection conveyor 368 positioned over each conveyor leg region 144 of conveyor 104, as shown, or a plurality of ejection conveyors 368 over each conveyor leg region 144. Each ejection conveyor 368 may have a plurality of conveyor projections 372 that are positioned and dimensioned to collectively engage one or a plurality of conveyor leg slots 148 simultaneously. For example, ejection conveyor 368 has conveyor projections 372 that are positioned and dimensioned to engage three conveyor leg slots 148 simultaneously, as shown. This may allow conveyor projections 372 to collectively move along substantially the entire lateral (i.e. cross-machine direction) stroke of the conveyor projections 372 within each slot 148 as conveyor 104 continues to advance in the machine direction. In other embodiments, conveyor 104 may pause intermittently to allow ejection conveyor 368 to eject crustacean legs 124 into meat extraction rollers 136.

Still referring to FIGS. 14 and 15, conveyor projections 372 may move along a continuous path, and during a portion of that path conveyor projections 372 may move laterally (i.e. in a cross-machine direction) in engagement with (e.g. while extending into) conveyor leg slots 148. The lateral (i.e. cross-machine direction) length of that engagement between conveyor projections 372 and conveyor leg slots 148 may be referred as an engagement length 376. Each ejection conveyor 368 may include any engagement length 376 that can allow conveyor projections 372 to collectively move crustacean legs 124 into engagement with meat extraction rollers 136. In some embodiments, the engagement length 376 is greater than ½ of the conveyor leg slot length 378. For example, engagement length 376 may be greater than ¾ of the conveyor leg slot length 378 as shown. This can promote the successful transfer of crustacean legs 124 into engagement with meat extraction rollers 136.

Conveyor projections 372 can have any structure that allows them to move crustacean legs 124 along conveyor leg slots 148 into engagement with meat extraction rollers 136, and that will not unduly obstruct machine-direction movement of conveyor 104 as leg slot walls 164 move through conveyor projections 372. In some embodiments, conveyor projections 372 may include soft (i.e. flexible) paddles as shown, rigid paddles, or bristles (soft and/or rigid) for example.

Ejection conveyors 368 may be driven in any manner. In the illustrated example, both ejection conveyors 368 are driven by a common motor 382. The opposite rotating directions are provided by a transmission 383. In other embodiments, each ejection conveyor 368 may be driven independently by a different motor.

Figure 16:
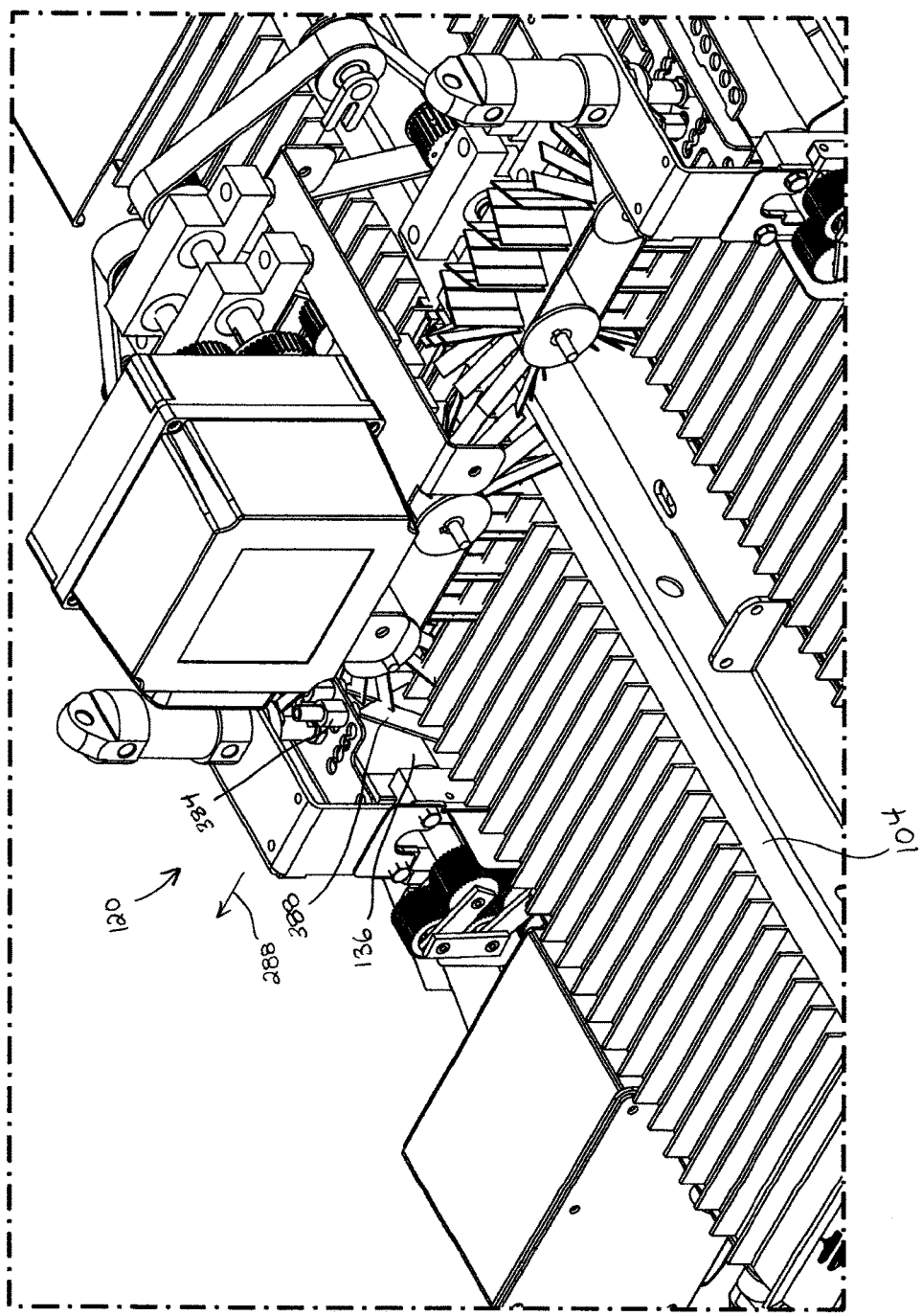
FIG. 16 is a rear perspective view of a meat extraction station of FIG. 14 in accordance with an embodiment.
Figure 17:
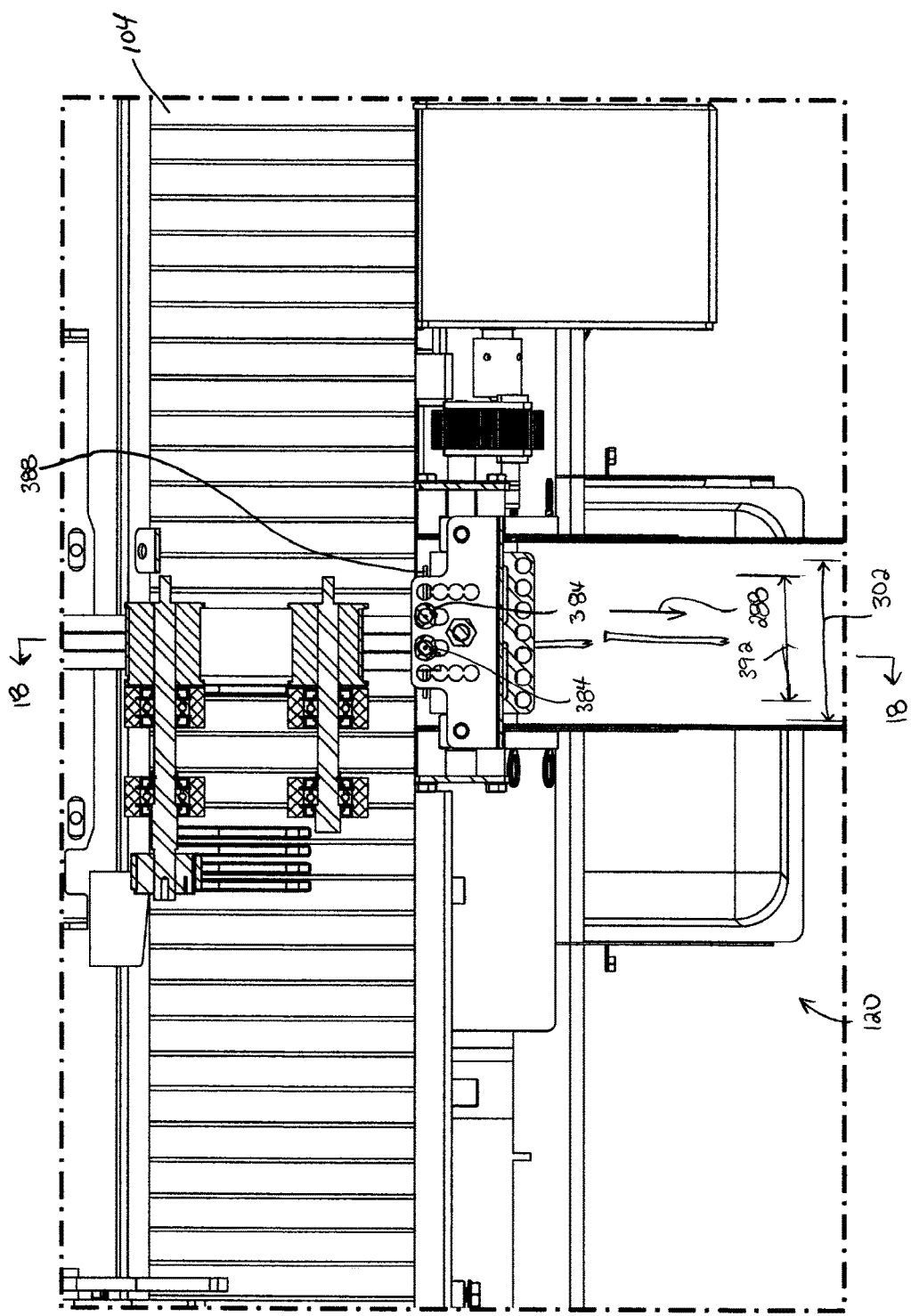
FIG. 17 is a partial top plan view of the meat extraction station of FIG. 16.
Figure 18:
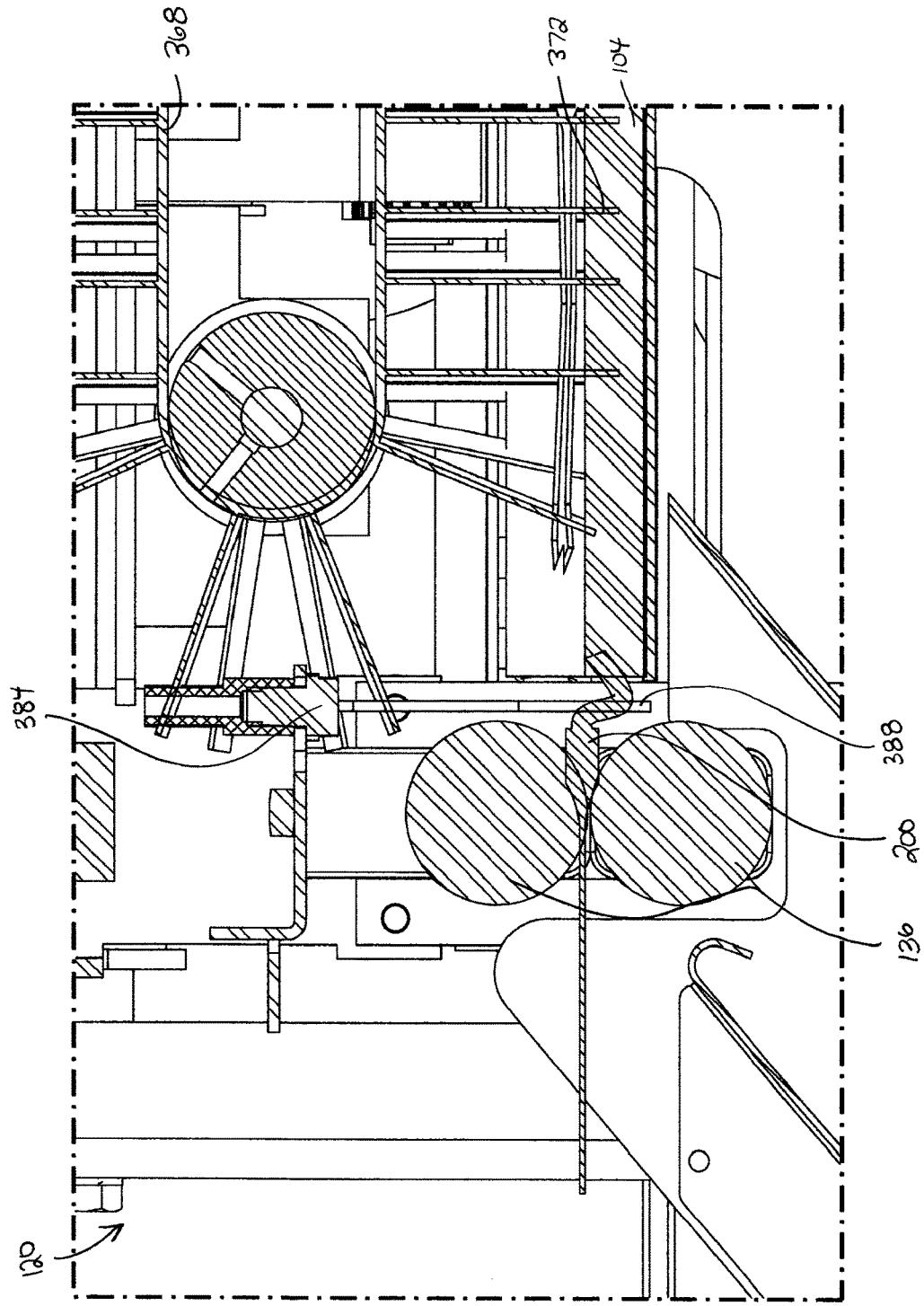
FIG. 18 is a cross-sectional view taken along lines 18-18 in FIG. 17.

Reference is now made to FIGS. 16-18. As shown, meat extraction station 120 may include one or more spray nozzles 384 positioned and oriented to spray fluid jets 388 against leg meat 200 as it is extracted by meat extraction rollers 136. The fluid jets 388 may be oriented transverse to a downstream direction 288 through meat extraction rollers 136, and directed between the meat extraction rollers 136 and conveyor 104. This allows fluid jets 388 to deflect (e.g. bend) the leg meat 200 away from meat extraction rollers 136. This may help prevent the leg meat 200 from entering meat extraction rollers 136, and instead encourage the leg meat 200 to collect in a leg meat receptacle (not shown).

Spray nozzles 384 may have any position and orientation suitable for spraying fluid jets 388 that deflect leg meat 200 from entering meat extraction rollers 136. In the illustrated example, spray nozzles 384 are positioned and oriented to spray fluid jets 388 downwardly between conveyor 104 and meat extraction rollers 136. In other embodiments, spray nozzles 384 may be oriented to spray fluid jets 388 in a different direction transverse to roller downstream direction 288, such as horizontally or upwardly for example.

Meat extraction station 120 may include any number of spray nozzles 384. For example, meat extraction station 120 may include one or a plurality of spray nozzles 384 associated with each respective lateral side of conveyor 104. In the illustrated example, meat extraction station 120 includes two spray nozzles 384 for each lateral side of conveyor 104. Where a plurality of spray nozzles 384 are provided on one lateral side of conveyor 104, those spray nozzles 384 may be the same or different, may be oriented the same or differently, and may be arranged side-by-side in the machine direction or cross-machine direction. In the example shown, the spray nozzles 384 are the same, oriented the same, and arranged side-by-side in a machine direction.

Spray nozzles 384 may be configured to produce any suitable type of fluid jet 388. The fluid jet 388 may be intermittent or continuous. The spray nozzle(s) 384 associated with the meat extraction rollers 136 of one lateral side of conveyor 104 may produce fluid jet(s) 388 having any suitable machine-direction spray width 392. In some embodiment, the spray nozzle(s) collectively form a fluid curtain (e.g. water curtain) having a width 392 that is at least ½ of the roller width 302. In the illustrated embodiment, spray nozzle(s) collectively form a fluid curtain having a width 392 that is at least ¾ of the roller width 302. This allows the fluid jet(s) 388 to act upon crustacean leg meat 200 that may be extracting from different positions along the meat extraction rollers 136.

Spray nozzles 384 may spray any fluid (liquid or gas). Preferably, the fluid should be safe for contact with food. For example, spray nozzles 384 may spray a liquid, such as clean (i.e. potable) water.

Figure 19:
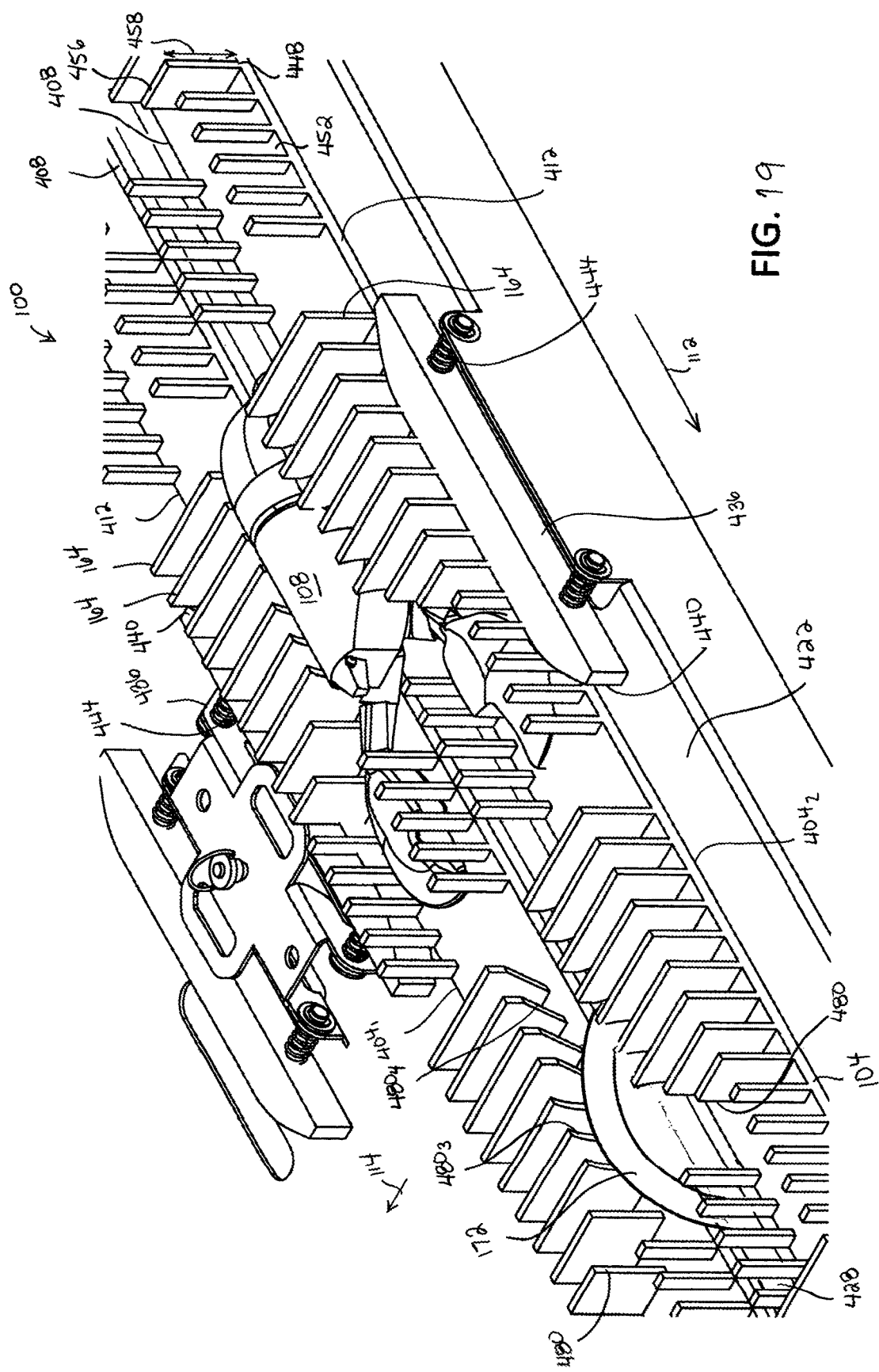
FIG. 19 is a partial perspective view of an apparatus for crustacean processing in accordance with another embodiment.
Figure 20:
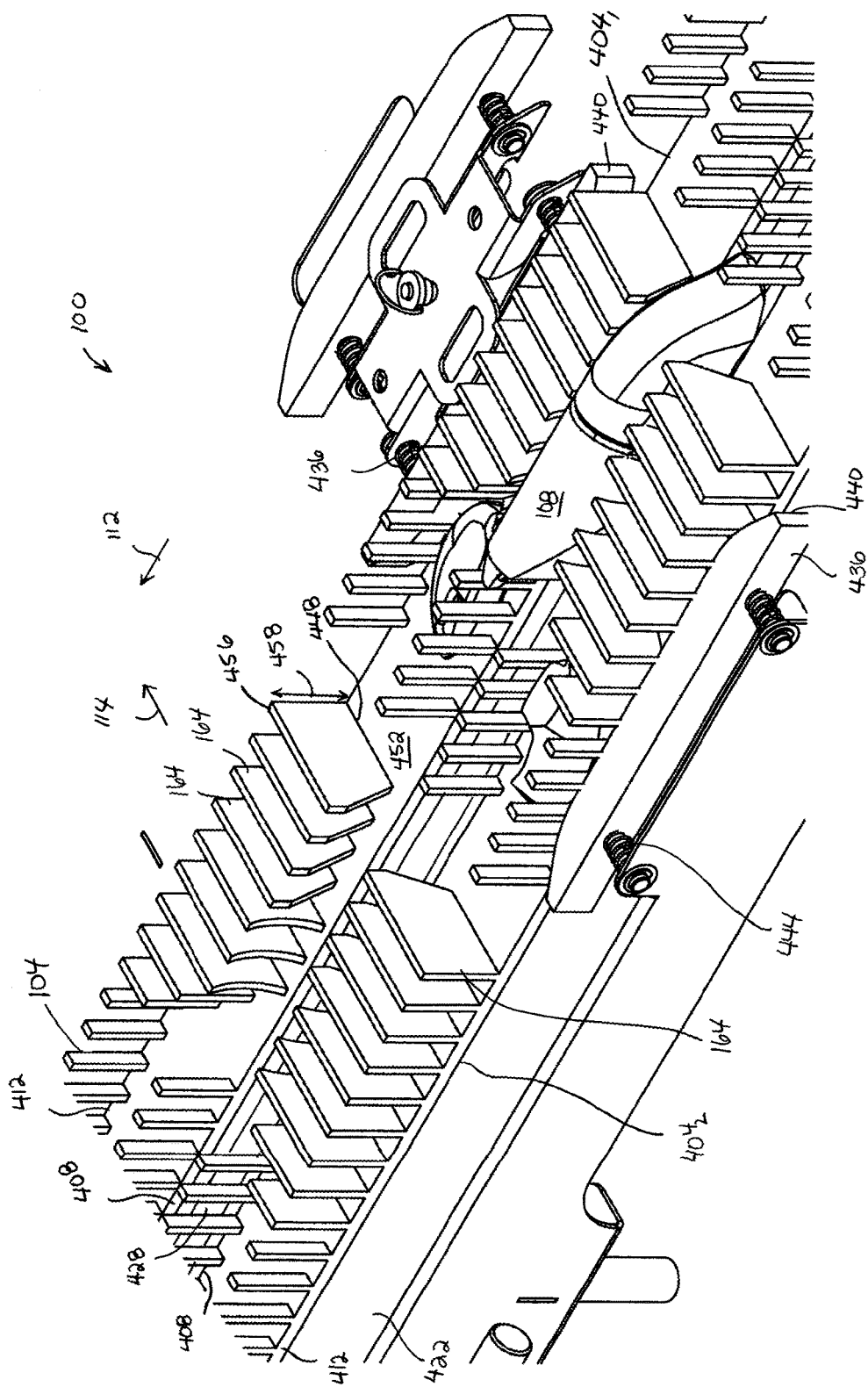
FIG. 20 is another partial perspective view of the apparatus of FIG. 19, with a blade omitted.
Figure 21:
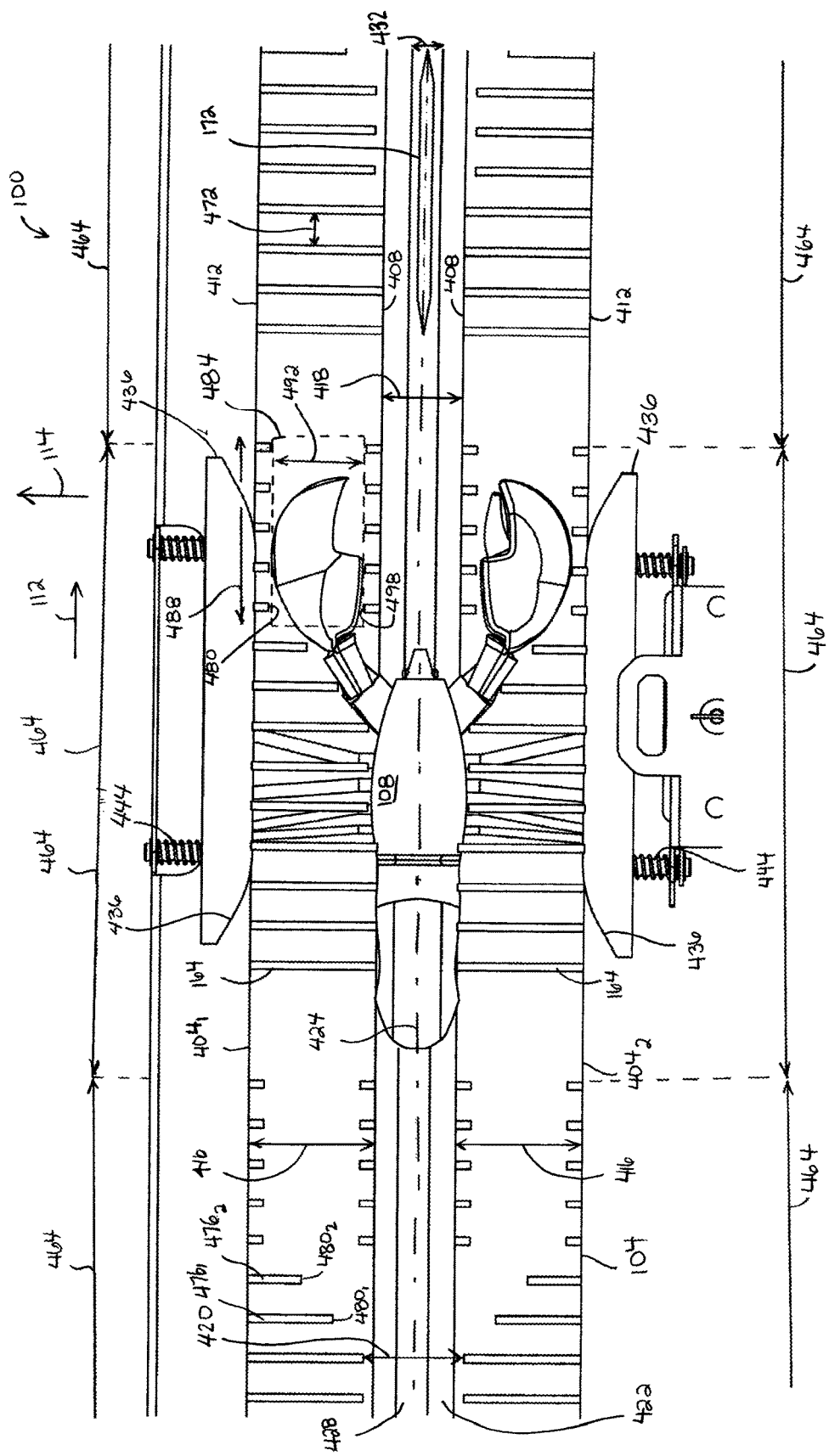
FIG. 21 is a partial top plan view of the apparatus of FIG. 19.

Reference is now made to FIGS. 19-21, which show an apparatus 100 including a conveyor 104 in accordance with another embodiment. Conveyor 104 may be used in connection with any apparatus for crustacean processing, such as apparatus 100 (FIG. 1) described above, or another apparatus for crustacean processing (e.g. that extracts meat from, scores, and/or cuts an entire crustacean or portion thereof).

As shown, conveyor 104 may include first and second belts $404_1$ and $404_2$. Conveyor 104 moves belts $404_1$ and $404_2$ in machine direction 112. Preferably, belts $404_1$ and $404_2$ move at the same speed in machine direction 112. Each of belts $404_1$, $404_2$ has an inner lateral belt end 408, an outer lateral belt end 412, and a lateral belt width 416 measured in the cross-machine direction 114 from the inner lateral belt end 408 to the outer lateral belt end 412.

Still referring to FIGS. 19-21, each belt $404_1$, $404_2$ includes a plurality of upstanding crustacean placement guides 164. As shown, placement guides 164 may be sized and arranged on belts $404_1$, $404_2$ to flank a crustacean 108 (or part(s) thereof). This allows placement guides 164 to guide (e.g. restrict or limit) the placement of a crustacean 108 (or part(s) thereof) to a particular orientation (e.g. right side-up or upside down, forwards or backwards or sideways, or any other specific orientation). This allows blades or other processing equipment associated with conveyor 104 to interact (e.g. cut, score, or extract meat) with crustacean 108 (or part(s) thereof) consistently and in the targeted manner. Placement guides 164 also make it easy to place a crustacean 108 (or part(s) thereof) on conveyor 104 (e.g. by a human operator) in the manner (e.g. orientation, limb spread, and machine direction spacing) required by the downstream processing equipment. As a result, the processed crustacean output of apparatus 100 may be higher quality (e.g. complete limbs, meat extracted intact, score lines not penetrating meat, shell not embedded in meat) and include less waste and damaged product (e.g. partial limbs, shredded meat, meat fouled by embedded shell fragments, etc.).

First belt $404_1$ may be spaced apart from second belt $404_2$ in the cross-machine direction 114. As shown, inner lateral belt end 408 of first belt $404_1$ may be laterally spaced apart from inner lateral belt end 408 of second belt $404_2$. Further, one or both of first and second belts $404_1$, $404_2$ may be biased laterally inwardly towards the other belt $404_1$ or $404_2$. This allows conveyor 104 to better accommodate and adapt to crustacean 108 (or body part(s) thereof) of different sizes. For example, the inward bias may reduce lateral belt spacing 418 to accommodate a smaller crustacean 108. In the illustrated example, this reduces a lateral guide spacing 420 between a placement guide 164 of first belt $404_1$ and a laterally opposed placement guide 164 of second belt $404_2$ to accommodate a smaller crustacean 108 between the opposed placement guides 164. Depending on the configuration of placement guides 164, this may permit the laterally opposed placement guides 164 to contact the crustacean 108, whereby the crustacean 108 may be better immobilized for downstream processing. In the example shown, conveyor 104 includes a floor 422 extending beneath belts $404_1$, $404_2$ that provides support for a crustacean 108 or part(s) thereof in the space between belts $404_1$, $404_2$.

One or both of belts $404_1$, $404_2$ may be inwardly biased towards the other belt $404_1$ or $404_2$. In the illustrated example, both of belts $404_1$, $404_2$ are biased inwardly towards machine direction centerline 424. This can allow the crustacean 108 carried by conveyor 104 to remain centered on machine direction centerline 424, which may be required for downstream processing equipment (e.g. a cutting blade for scoring or bisecting the crustacean along machine direction centerline 424).

Still referring to FIG. 19-21, conveyor 104 may include a blade gap 428 located between belts $404_1$ and $404_2$ and aligned with machine direction centerline 424. For example, blade gap 428 may be formed in conveyor floor 422. By biasing both of belts $404_1$, $404_2$ (e.g. equally) towards machine direction centerline 424, the crustacean 108 may remain centered over glade gap 428 as belts $404_1$, $404_2$ move under bias in the cross-machine direction to accommodate crustacean 108. In the illustrated example, a cutting blade 172 is positioned extending through blade gap 428 to score or cut crustacean 108. Cutting blade 172 may have a fixed position within blade gap 428 or may be movable (e.g. retractable and extendible) into the position extending through blade gap 428.

Blade gap 428 can have any gap width 432 in the cross-machine direction that can accommodate a cutting blade. For example, gap width 432 may be at least 0.5 mm (e.g. 0.5 mm to 5 cm). In some embodiments, gap width 432 is equal to lateral belt spacing 418 and varies according to the inward bias applied to belt(s) $404_1$, $404_2$, and the crustacean 108 being carried. In this case, inward movement of belts $404_1$, $404_2$ may be constrained so that a minimum gap width 432 of at least 0.5 mm (e.g. 0.5 mm to 5 cm) is maintained.

In alternative embodiments, conveyor 104 does not have a blade gap 428. For example, the downstream processing equipment may not require it. Alternatively or in addition to having no blade gap 428, in some embodiments only one of belts $404_1$, $404_2$ is biased towards the other belt $404_1$, $404_2$. For example, the downstream processing equipment may not require that the carried crustacean or body part(s) thereof remain consistently centered. This can provide conveyor 104 with a design that is less complex and less expensive to manufacture.

Still referring to FIGS. 19-21, one or both of belts $404_1$, $404_2$ may be inwardly biased in any manner that allows conveyor 104 to better accommodate crustaceans (or body part(s) thereof) of different sizes. As seen in the illustrated embodiment, a belt $404_1$, or $404_2$ may be biased towards the other belt $404_1$ or $404_2$ by a belt guide 436. A belt guide 436 may apply a laterally inward force (i.e. directed towards machine direction centerline 424) against the associated belt $404_1$ or $404_2$ thereby urging the belt $404_1$ or $404_2$ to move towards the other belt $404_2$ or $404_1$. Preferably, the belt(s) $404_1$, $404_2$ biased in the manner have sufficient flexibility to deflect laterally inwardly under the influence of bias. This allows belts $404_1$ and $404_2$ at different locations along the machine direction 112, to have different lateral belt spacings 418, in accordance with the sizes of crustacean or crustacean body parts at the different machine direction locations. In the illustrated embodiment, each belt $404_1$, $404_2$ is associated with a respective belt guide 436, which urges that belt $404_1$, $404_2$ to deflect towards the other belt $404_1$, $404_2$.

A belt guide 436 can have any configuration suitable to bias a belt $404_1$ or $404_2$ laterally inwardly towards the other belt $404_2$ or $404_1$. In the illustrated example, each belt guide 436 is located laterally outwardly of the associated belt $404_1$ or $404_2$ and exerts a laterally inward force (i.e. towards machine direction centerline 424) against the belt $404_1$ or $404_2$. For example, belt guide 436 may exert a laterally inwardly force against outer lateral belt end 412. As shown, belt guide 436 may include a belt contacting portion 440, which exerts force against belt $404_1$ or $404_2$, and a bias 444 that supplies the force for belt contacting portion 440 to exert. Bias 444 can be any member that can supply the laterally inward force for belt contacting portion 440 to exert against belt $404_1$ or $404_2$. For example, bias 444 may include a spring as shown, a piston cylinder, or another resiliently extendible member. In some embodiments, belt contacting portion 440 and bias 444 are one and the same. For example, belt contacting portion 440 may be a spring or other resiliently extendible/compressible.

Belt guide 436 may exert any bias force against belt $404_1$ or $404_2$ suitable for allowing conveyor 104 to better accommodate crustaceans 108 of different sizes. For example, the bias force may be between 0.3 lbf and 20 lbf. A bias force in this range may be great enough to permit the belt guide 436 to overcome the resistance of the belt 404₁ or 404₂ to deflecting inwardly, and also not so great that it crushes the crustacean (or body part thereof) between the biased belts 404₁ and 404₂. In other embodiments, the bias force may be greater or lesser than this range, as may be required by the intended application.

The belt contacting portion 440 of belt guides 436 may have a limited lateral travel distance between extended and contracted positions, which may limit (i) how far belts 404₁ and 404₂ can move laterally outwardly, and (ii) how far belts 404₁ and 404₂ may be deflected laterally inwardly by belt guides 436. In some embodiments, belt guides 436 can deflect belts 404₁ and 404₂ until inner lateral belt ends 408 meet (e.g. at machine direction centerline 424). In other embodiments, inner lateral belt ends 408 are spaced apart when belt guides 436 are fully extended laterally inwards. This may maintain at least a minimum blade gap width 432, as discussed above.

Still referring to FIGS. 19-21, placement guides 164 can have any configuration suitable to guide the placement of a crustacean or part(s) thereof on conveyor 104. As shown, placement guides 164 may be upstanding, in that they extend from a lower guide end 448 connected to upper belt surface 452 to an upper guide end 456 spaced above upper belt surface 452. Placement guides 164 can have any height 458 extending from lower guide end 448 to upper guide end (e.g. measured in a direction perpendicular to machine direction 112 and cross-machine direction 114, e.g. perpendicular to upper belt surface 452) suitable to guide the placement of the crustacean or part(s) thereof on conveyor 104. For example, guide height 458 may be between 2 cm and 10 cm. A guide height 458 in this range may correspond roughly to between 50% and 200% of a height of many crustaceans and crustacean body parts. In other embodiments, placement guides 164 may have guide heights 458 outside this range depending on the intended application.

Each belt 404₁ and 404₂ may include a plurality of placement guides 164. Within each belt 404₁ and 404₂, one monolithic placement guide 164 or a group of discrete placement guides 164 may be provided to help guide the placement of a single crustacean 108 (or crustacean body part). The belt 404₁ or 404₂ may include many belt sections 464, each including the one placement guide 164 or group of discrete placement guides 164, and the belt sections 464 may repeat along the machine direction length of the belt 404₁ or 404₂ so that the conveyor 104 can carry many of the crustacean or crustacean body parts placed according to the placement guides 164.

Figure 22:
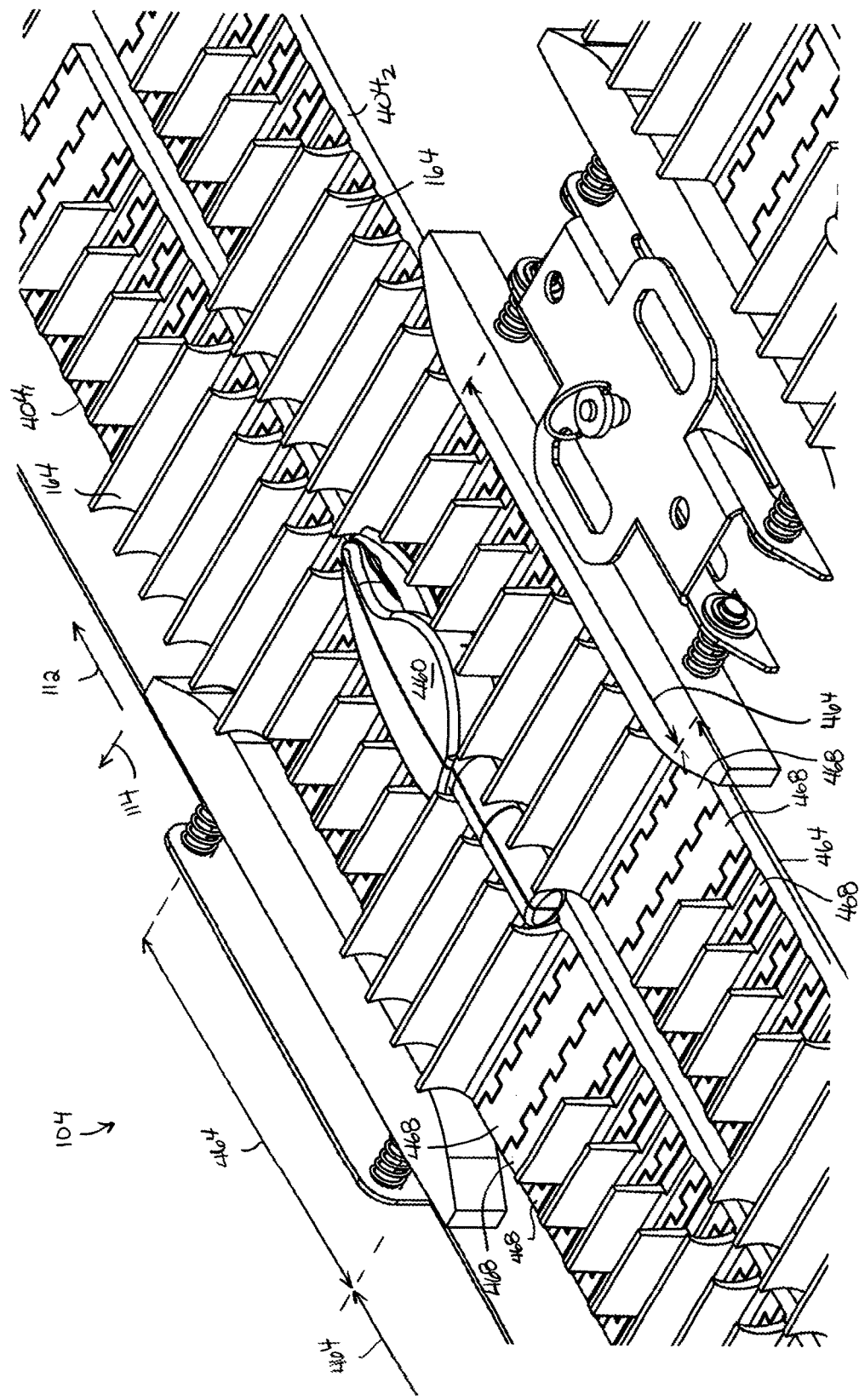
FIG. 22 is a partial perspective view of a crustacean conveyor carrying a claw and knuckle in accordance with another embodiment.
Figure 23:
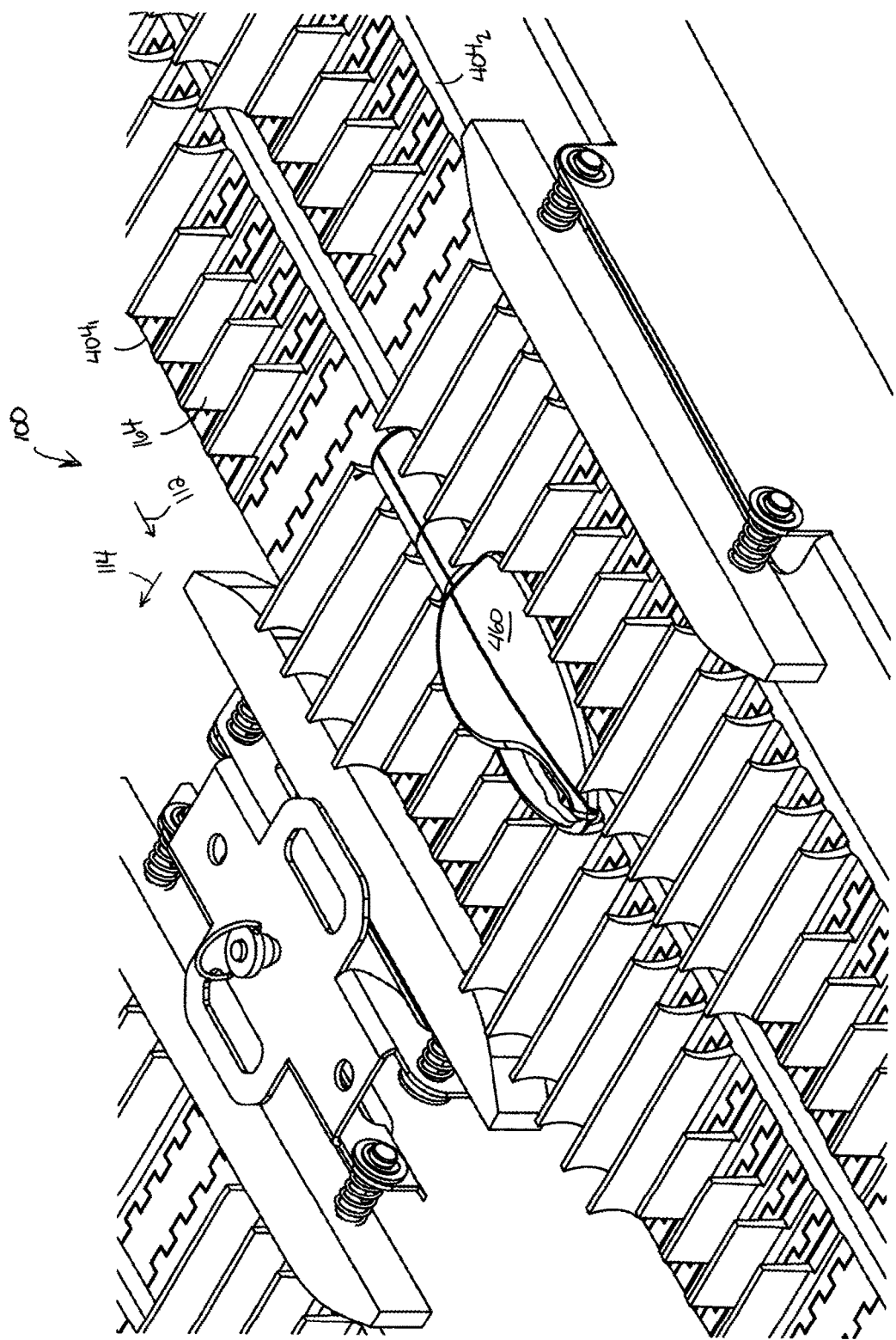
FIG. 23 is another partial perspective view of the conveyor of FIG. 22.
Figure 24:
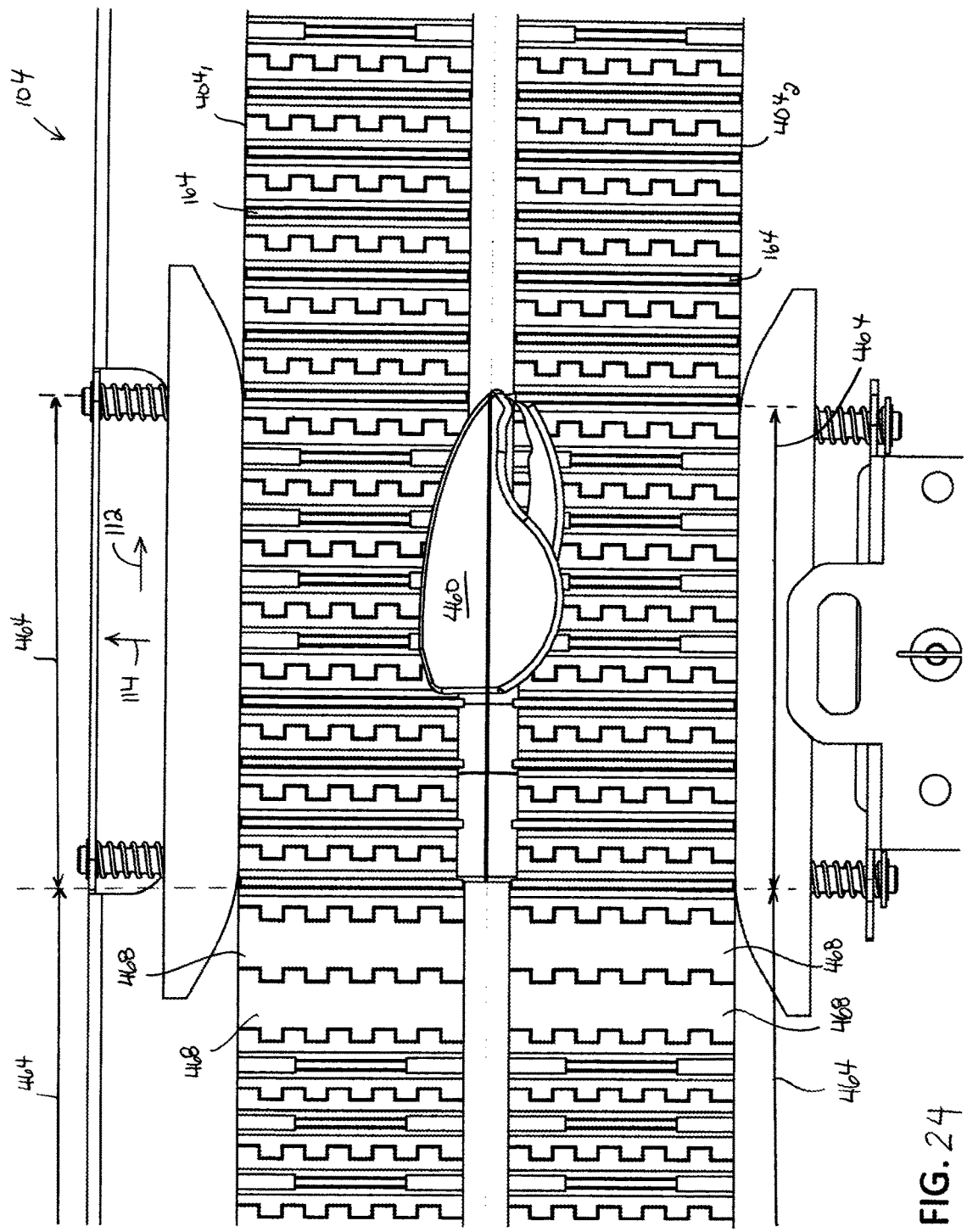
FIG. 24 is a partial top plan view of the conveyor of FIG. 22.

FIGS. 19-21 show an example in which conveyor 104 includes belts 404₁ and 404₂ with placement guides 164 configured to support whole crustaceans 108. FIGS. 22-24 show another embodiment of conveyor 104 with belts 404₁ and 404₂ having placement guides 164 configured to support dismembered crustacean body parts 460.

Reference is now made to FIGS. 19-21. In the illustrated example, each belt section 464 of each belt 404₁ and 404₂ is shown including a plurality of discrete placement guides 164 arranged along the machine-direction length of the belt section 464. As compared with a monolithic placement guide 164 which extends the full length of belt section 464, the use of discrete placement guides 164 may permit belts 404₁ and 404₂ to bend more easily around conveyor rollers to create an endless belt loop. FIGS. 22-24 show an example in which each belt section 464 includes a plurality of belt segments 468 rotatably connected to each other (i.e. rotatable about an axis parallel to the cross-machine direction 114) one after the next in the machine-direction 112. As shown, each placement guide 164 may be connected (e.g. rigidly and/or directly connected) to one particular belt segment 468 within the belt section 464. This can allow belt segments 468 and placement guides 164 to be made of more rigid materials, which may be more durable for example. Conveyor 104 may carry many thousands of crustaceans or crustacean body parts 460 per year when used in a factory setting.

Returning to FIGS. 19-21, within a belt section 464, longitudinally sequential placement guides 164 (i.e. located one after the next in the machine-direction 112) may be spaced apart as shown, or in contact with each other. In the illustrated example, longitudinally sequential placement guides 164 (also referred to as "longitudinally adjacent placement guides 164) may be spaced apart by a guide separation distance 472 measured in the machine direction 112. In some embodiments, guide separation distance 472 may be between 0.5 cm and 5 cm. This may correspond roughly to between 3% and 33% of the length of a crustacean 108 or crustacean body part 460 (FIG. 22) that may be carried by conveyor 104. Other guide separation distance 472 may be used depending on the intended application.

Belt sections 464 of belts 404₁ and 404₂ may be aligned laterally (i.e. in the cross-machine direction 114) so that the belt sections 464 cooperate to guide the placement of a crustacean 108 or crustacean body part 460. For example, at least a portion of the crustacean 108 or crustacean body part 460 (FIG. 24) may be held in the lateral guide spacing 420 between placement guide(s) 164 of the first belt 404₁ and placement guide(s) 164 of the second belt 404₂. As shown, the placement guides 164, within a belt section 464 of first belt 404₁, may be laterally aligned with the placement guides 164 with the corresponding belt section 464 of second belt 404₂. In alternative embodiments, the placement guides 164 of first belt 404₁ may be staggered in the machine direction 112 as compared to the placement guides 164 of second belt 404₂.

Still referring to FIGS. 19-21, lateral guide spacing 420 between placement guides 164 may vary along the machine direction length of a pair of aligned belt sections 464. This may be done to shape the spacing between placement guides 164 of belts 404₁ and 404₂ to correspond with the shape profile of the crustacean 108 or crustacean body part 460 (FIG. 22) that conveyor 104 is designed to carry. For example, laterally opposed placement guides 164 of belts 404₁ and 404₂ in one portion of a belt section 464 may define a lateral guide spacing 420 different from (e.g. greater than or less than) laterally opposed placement guides 164 of belts 404₁ and 404₂ in another portion of belt section 464. This may permit placement guides 164 to better immobilize a crustacean 108 or crustacean body part 460 (FIG. 22) carried by conveyor 104.

As an illustrative example, FIG. 21 shows belt 404₁ including placement guides 476₁ and 476₂, each having an inner lateral guide end 480₁ or 480₂ respectively. As shown, inner lateral guide end 480₂ is laterally offset (i.e. in the cross-machine direction) as compared to guide end 480₁. Consequently, inner lateral guide end 480₁ is located closer to second belt 404₂ than inner lateral guide end 480₂. Again, such contouring may permit placement guides to be specially configured to accommodate the general shape profile (e.g. shape outline in plan view) of a crustacean or crustacean body part.

Still referring to FIGS. 19-21, placement guides 164 of a pair of laterally aligned belt sections 464 may define a lateral guide spacing 420 which may remain constant or vary along the machine direction length of the belt sections 464. In addition, the lateral guide spacing 420 may be consistently symmetric about machine direction centerline 424 along the machine direction length of the belt sections 464 as shown. For example, for each pair of laterally opposed placement guides 164 of the first and second belts $404_1$, $404_2$, both placement guides 164 may include an inner lateral guide end 480 that is equidistant from the machine direction centerline 424 in a direction parallel to the cross-machine direction 114. This may be the case where the inner lateral guide end 480 of both placement guides 164 is spaced the same (if at all) from its respective inner lateral belt end 408. Such symmetric arrangement of placement guides 164 as between first and second belts $404_1$, $404_2$ may be suitable for holding a symmetric crustacean 108 or crustacean body part.

Figure 25:
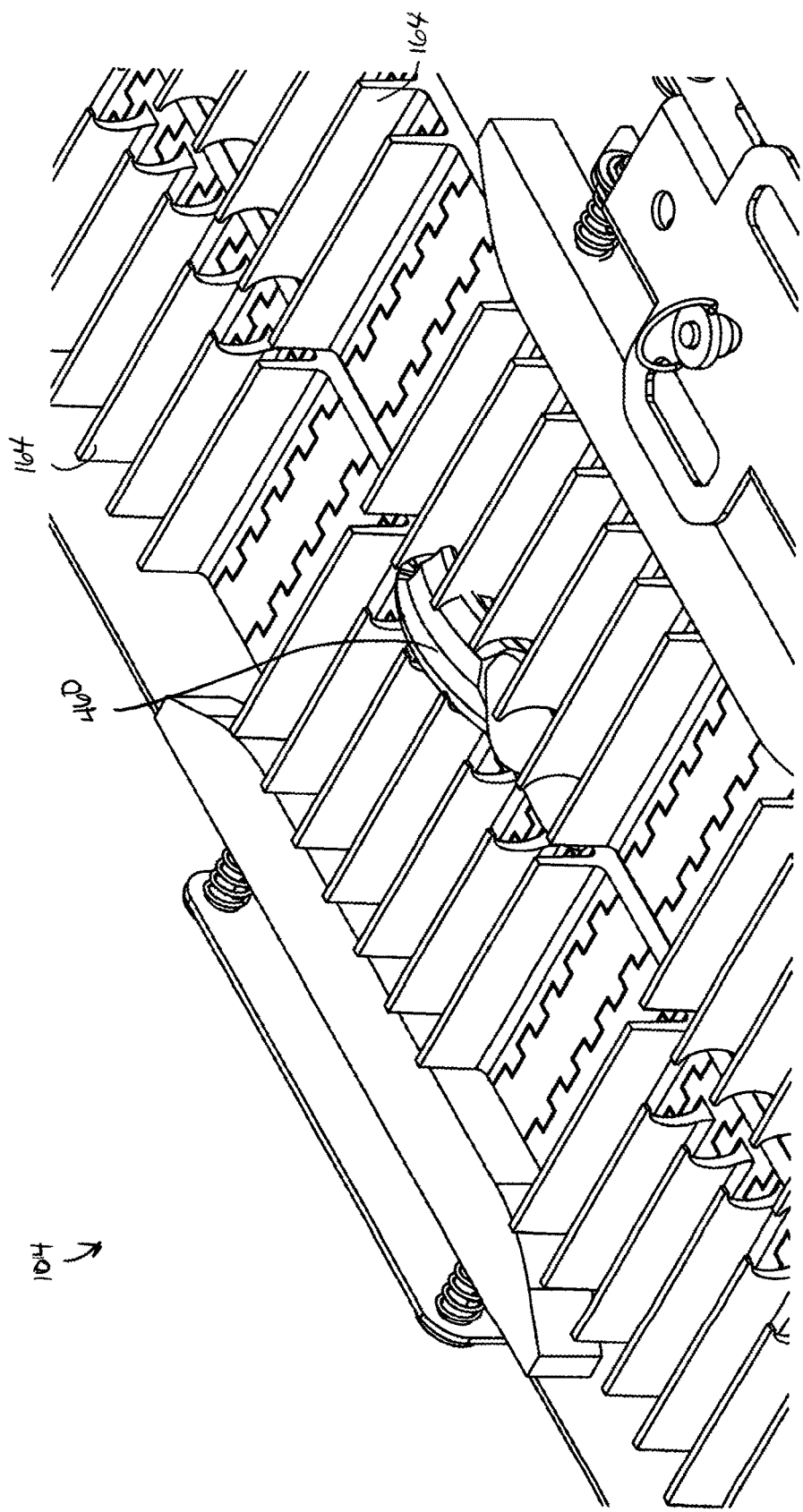
FIG. 25 is a partial perspective view of a crustacean conveyor carrying a crab claw and arm in accordance with another embodiment.
Figure 26:
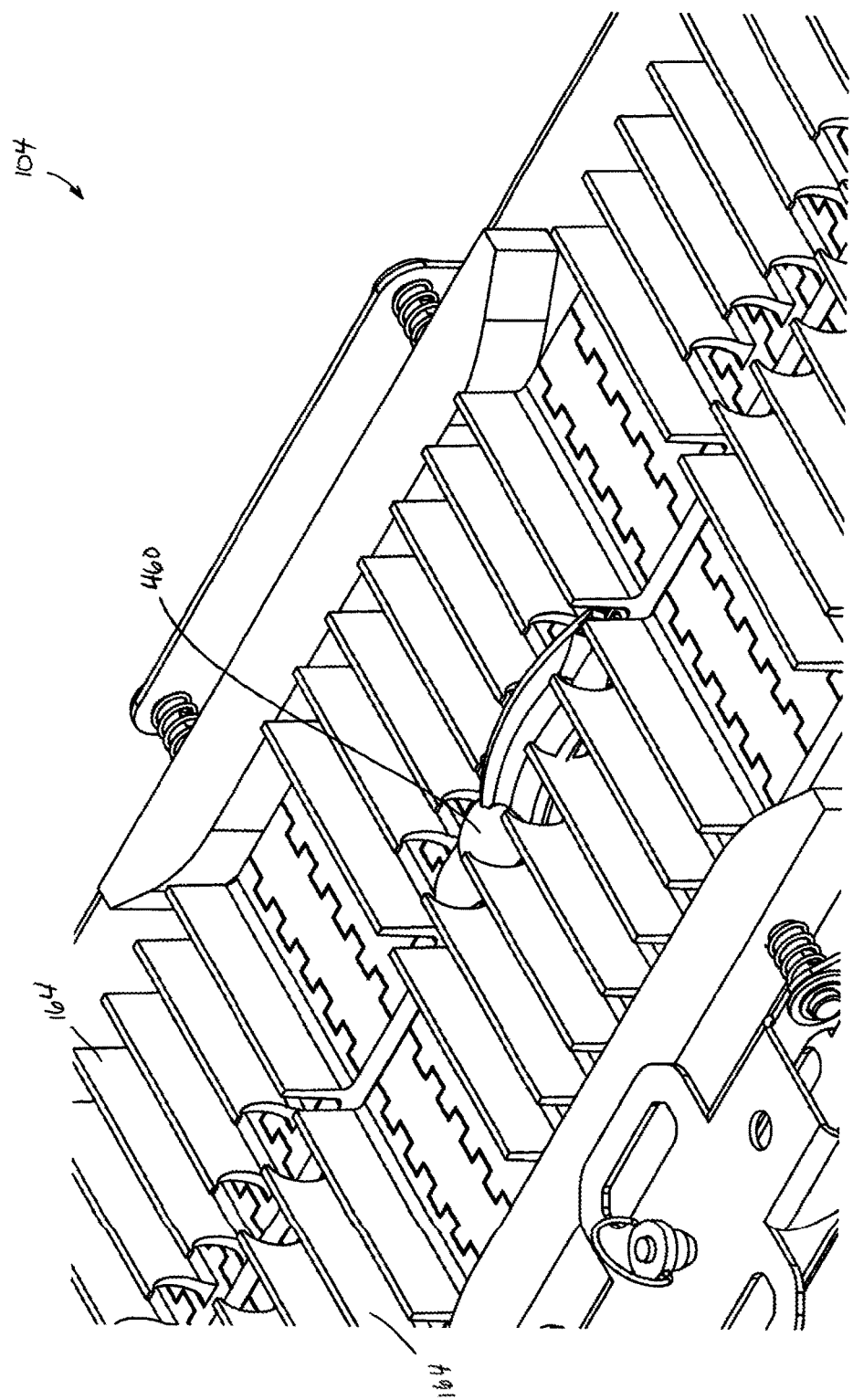
FIG. 26 is another partial perspective view of the conveyor of FIG. 25.
Figure 27:
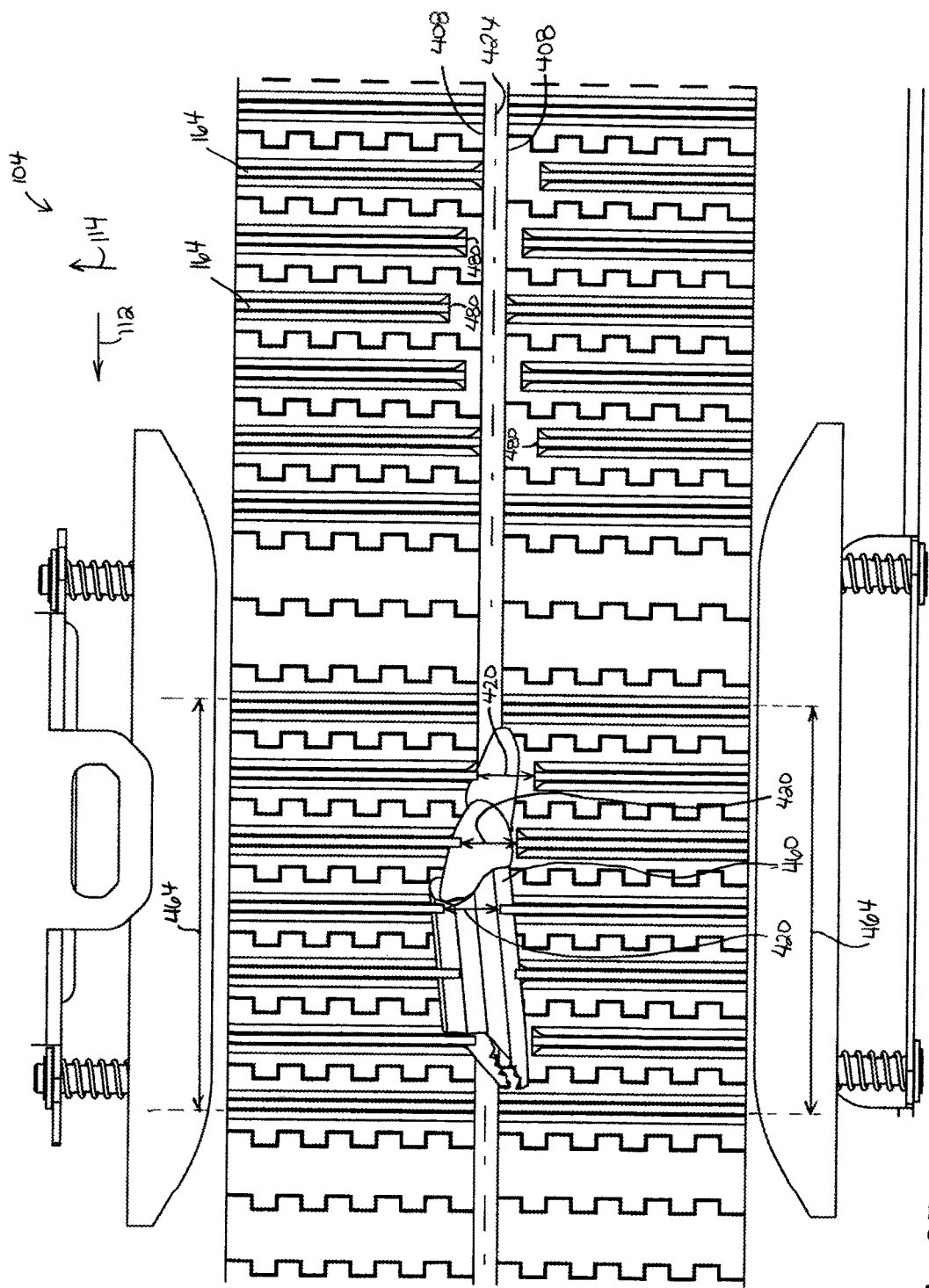
FIG. 27 is a partial top plan view of the conveyor of FIG. 25.

FIGS. 25-27 show an embodiment of conveyor 104 with placement guides 164 configured to hold a curved crustacean body part 460. In this example, crustacean body part 460 includes a crab arm and claw. As shown, placement guides 164 of a pair of laterally aligned belt sections 464 may define a lateral guide spacing 420 which may be asymmetric about machine direction centerline 424 along some or all of the machine direction length of belt section 464 as shown. For example, for some or every pair of opposed placement guides 164 of the first and second belts $404_1$, $404_2$, the two inner lateral guide ends 480 may be spaced by different distances from the machine direction centerline 424 in a direction parallel to the cross-machine direction 114. This may be the case where the inner lateral guide end 480 of both placement guides 164 are differently spaced from their respective inner lateral belt end 408. Such asymmetric arrangement of placement guides 164 as between first and second belts $404_1$, $404_2$ may be suitable for holding an asymmetric crustacean body part 460 as shown.

The eccentricity of the lateral guide spacing 420 may remain the same across the longitudinal length of a pair of laterally aligned belt section 464, or may vary as shown. In the illustrated embodiment, the lateral guide spacing 420 varies along the machine direction length from offset towards second belt $404_2$, to offset towards first belt $404_1$, and then to offset towards second belt $404_2$ again. This allows conveyor 104 to guide the placement of a curved crustacean body part 460 as shown.

Figure 28:
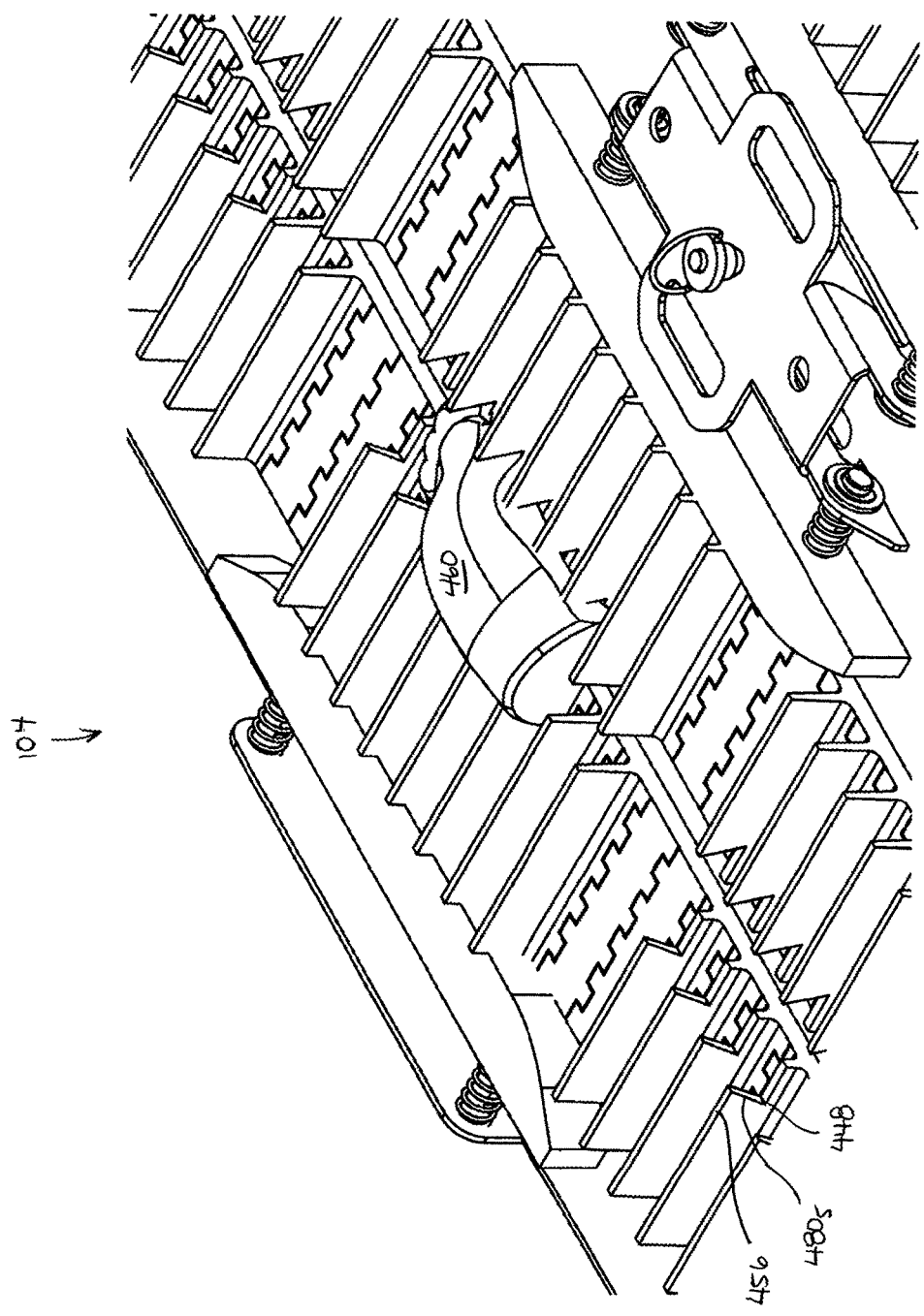
FIG. 28 is a partial perspective view of a crustacean conveyor carrying a lobster tail in accordance with another embodiment.
Figure 29:
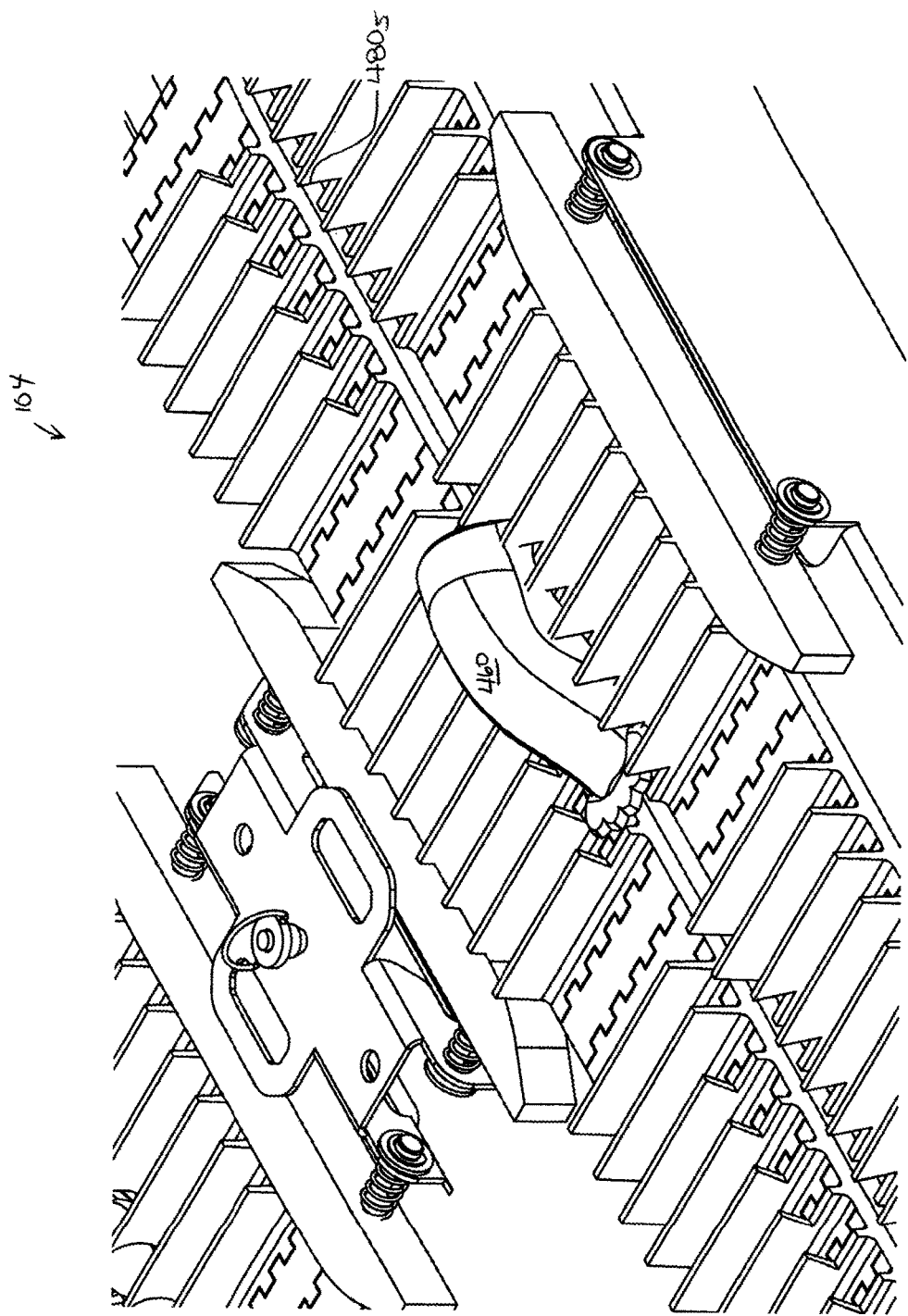
FIG. 29 is another partial perspective view of the conveyor of FIG. 28.
Figure 30:
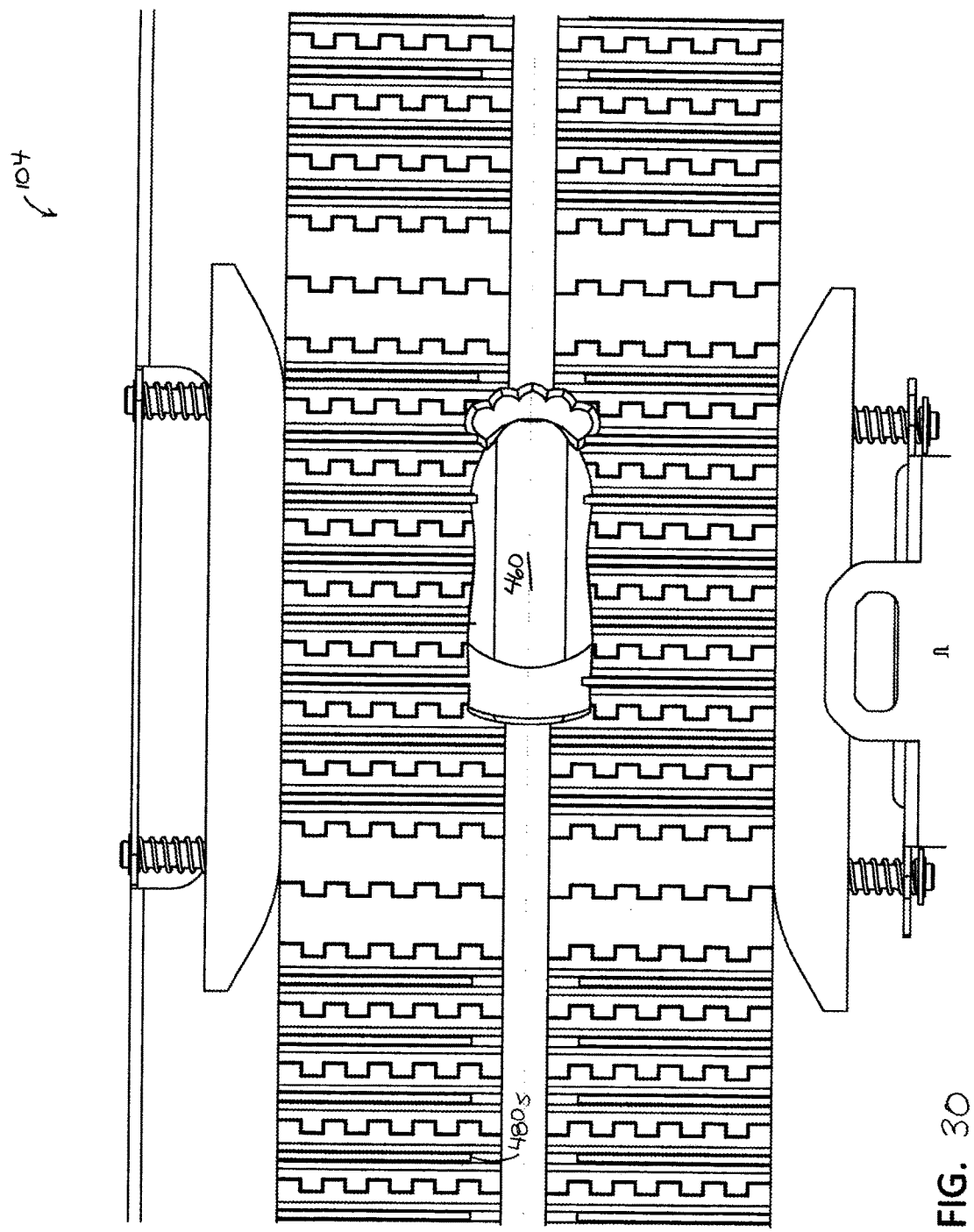
FIG. 30 is a partial top plan view of the conveyor of FIG. 28.

Referring to FIG. 19, each placement guide 164 may include an inner lateral guide end 480 (e.g. an inner lateral guide face). In some embodiment, the inner lateral guide end 480 of some or all placement guides 164 may be contoured to better accommodate (e.g. better conform to) the shape of the target crustacean 108 or crustacean body part. For example, a portion or all of an inner lateral guide end 480 (e.g. between lower guide end 448 and upper guide end 456) may be non-vertical (e.g. non-perpendicular to cross-machine direction 114, or non-perpendicular to upper belt surface 452). In the illustrated embodiment, conveyor 104 includes as examples inner lateral guide ends $480_3$ that are concave, and inner lateral guide ends $480_4$ that include both sloped and vertical portions. FIGS. 28-30 show an embodiment of conveyor 104 including inner lateral guide ends $480_5$ that are entirely sloped from lower guide end 448 to upper guide end 456.

Returning to FIG. 19, in some embodiments, a portion (or all) of an inner lateral guide end (e.g. inner lateral guide end $480_3$ or $480_4$) may face downwardly (e.g. have a normal vector directed downwardly at a non-zero angle from horizontal). This can allow the inner lateral guide end 480 to overlay at least a portion of the crustacean 108 or crustacean body part 460 (FIG. 25) to better immobilize the crustacean 108 during downstream processing. For example, this may allow placement guides 164 to inhibit (e.g. prevent or limit) the crustacean or crustacean body part from lifting off of upper belt surface 452 during processing (e.g. when scoring or cutting from below).

In alternative embodiments, none of inner lateral guide ends 480 is contoured. For example, all of inner lateral guide ends 480 may be vertical to allow easy insertion and removable of crustaceans 180 or crustacean body parts.

Referring to FIG. 21, in some embodiments a belt section 464 of belt $404_1$, $404_2$ may include one or more placement guides 164 that laterally flank a placement region 484. The placement region 484 may be sized and shaped to support a crustacean body part, such as a claw 496 as shown. The placement region 484 may be defined by flanking placement guide(s) 164. Between the flanking placement guide(s) 164, there may be (i) no placement guides as shown, or (ii) shorter placement guides. As shown, placement region 484 may include a longitudinal (i.e. machine direction) region length 488, and a lateral (i.e. cross-machine direction) region width 492. Region width 492 may be constant along region length 488 as shown, or may vary. In the illustrated embodiment, region width 492 is defined by laterally opposed (e.g. laterally aligned or staggered) placement guides 164 which laterally flank placement region 484 along region length 488. As shown, region width 492 may be defined by a cross-machine direction spacing between an inner lateral guide end 480 of an outer placement guide 164 and an outer lateral guide end 498 of the laterally opposed inner placement guide 164

Figure 31:
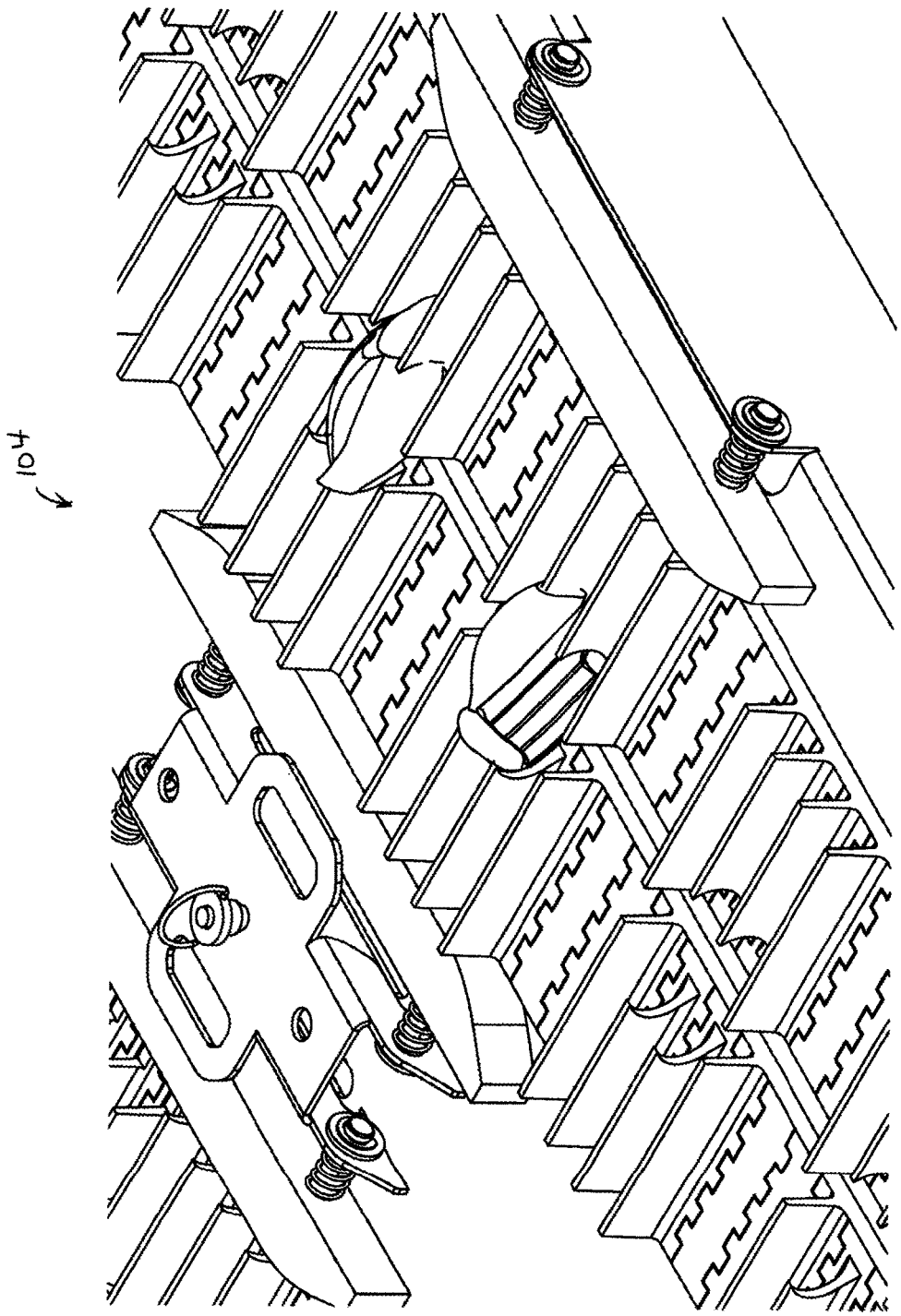
FIG. 31 is a partial perspective view of a crustacean conveyor carrying a folded crab claw and arm in accordance with another embodiment.
Figure 32:
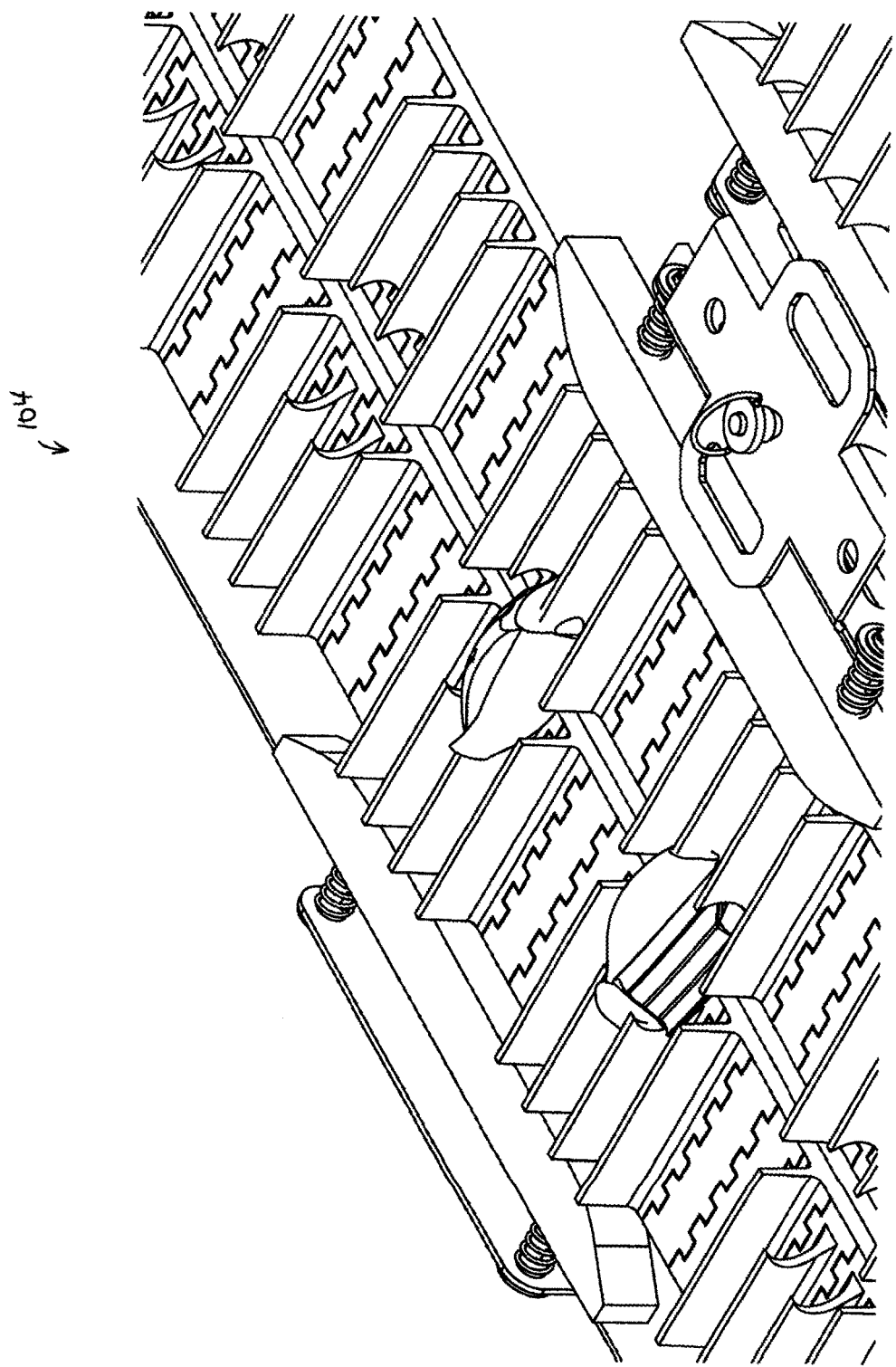
FIG. 32 is another partial perspective view of the conveyor of FIG. 31.
Figure 33:
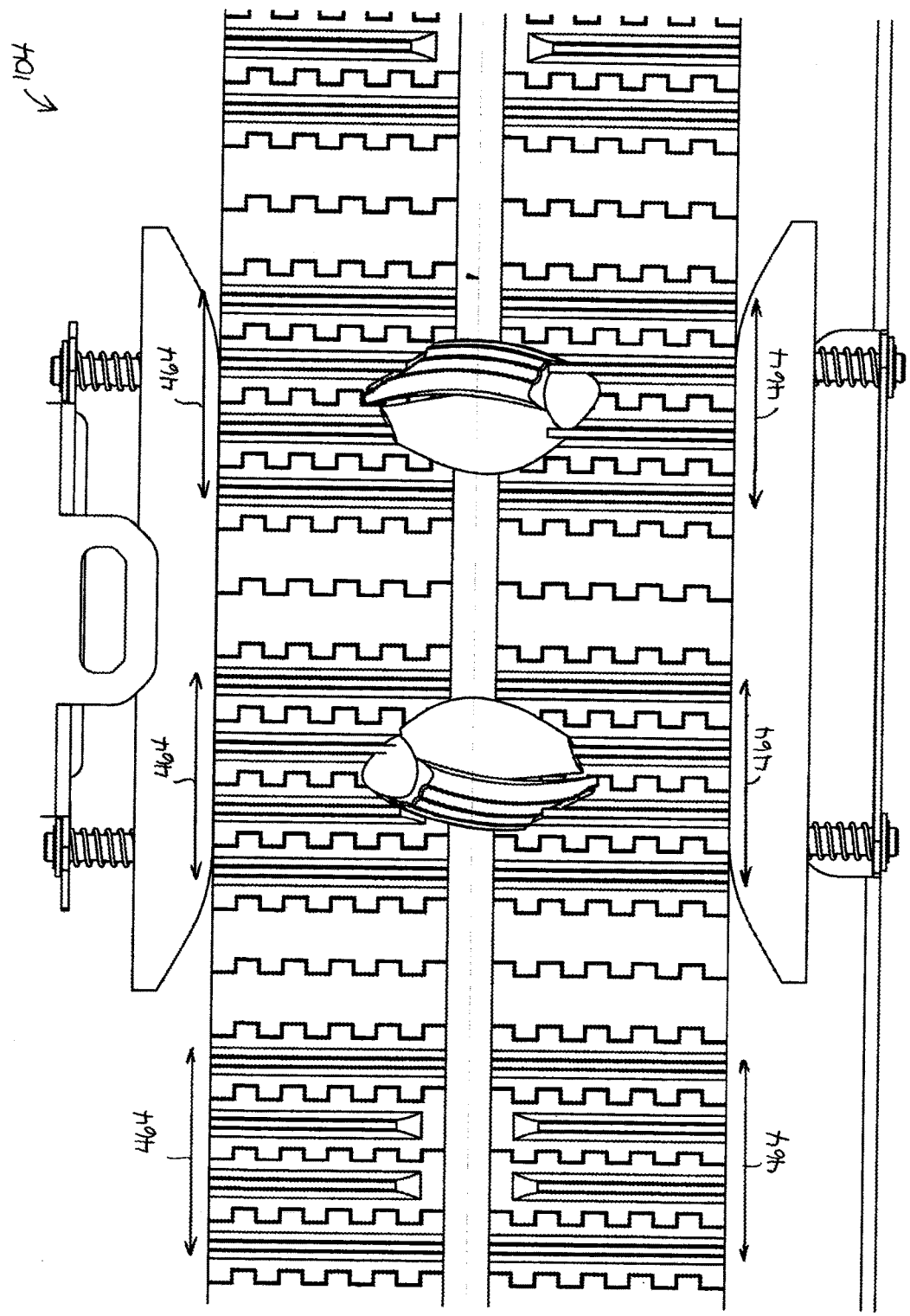
FIG. 33 is a partial top plan view of the conveyor of FIG. 31.

In alternative embodiments, such as shown in FIGS. 31-33 for example, neither of belts $404_1$, $404_2$ includes a placement region within a belt section 464.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A method of removing meat from crustacean legs, the method comprising:
    placing a crustacean on a conveyor, the crustacean having a plurality of crustacean legs extending from a crustacean body, the conveyor carrying the crustacean in a machine direction and the conveyor having a plurality of leg slots extending in a cross-machine direction;
    extending the crustacean legs outwardly from the crustacean body into the legs slots; and
    moving the crustacean legs along the legs slots into meat extraction rollers.

Item 2: The method of item 1, wherein:
    said extending the crustacean legs outwardly from the crustacean body into the leg slots comprises receiving the crustacean legs between laterally extending upstanding walls that are spaced apart in the machine direction to define the leg slots.

Item 3: The method of any one of items 1-2, wherein:
  said moving the crustacean legs along the leg slots into meat extraction rollers comprises directing a flow of pressurized fluid laterally against the crustacean legs to move the crustacean legs laterally outwardly into engagement with the meat extraction rollers.

Item 4: The method of any one of items 1-3, further comprising:
  drawing shells of the crustacean legs through the meat extraction rollers; and
  applying vacuum suction to leg meat of the crustacean legs to resist movement of the leg meat through the meat extraction rollers with the shells.

Item 5: The method of any one of items 1-3, further comprising:
  drawing the shell through the meat extraction rollers; and
  grasping the leg meat upstream of the meat extraction rollers using a mechanical gripper to resist movement of the leg meat through the meat extraction rollers with the shell.

Item 6: The method of item 1, further comprising:
  brushing the crustacean legs, with at least one brush roller, away from the crustacean body to straighten the crustacean legs into the leg slots.

Item 7: The method of item 6, wherein:
  said brushing comprises the brush roller applying forces to the crustacean legs downwardly and outwardly away from the crustacean body.

Item 8: The method of item 6, further comprising:
  after said brushing, transporting the crustacean legs under a retaining wall, the retaining wall at least limiting upward curling of the crustacean legs out of the leg slots.

Item 9: The method of item 1, wherein:
  said moving the crustacean legs along the leg slots comprises applying forces to the crustacean legs in the cross-machine direction with an ejection conveyor.

Item 10: The method of item 1, wherein:
  said moving the crustacean legs into the meat extraction rollers comprises passing crustacean leg shells downstream through the meat extraction rollers and extracting crustacean leg meat from the crustacean leg shells upstream of the meat extraction rollers, and
  the method further comprising deflecting the extracting crustacean leg transverse to a downstream direction through the meat extraction rollers using one or more fluid jets.

Item 11: An apparatus for removing meat from crustacean legs, the apparatus comprising:
  a conveyor having a crustacean body region flanked by laterally opposed crustacean leg regions, each crustacean leg region including a plurality of leg slots extending laterally outwardly of the crustacean body region; and
  a plurality of leg meat extraction rollers, positioned laterally outwardly of the leg slots and oriented to receive crustacean legs moved laterally outwardly from the leg slots.

Item 12: The apparatus of item 11, wherein:
  the conveyor comprises a plurality of laterally extending upstanding walls that are spaced apart in the machine direction to define the leg slots.

Item 13: The apparatus of any one of items 11-12, further comprising:
  a fluid nozzle positioned and oriented to direct a flow of pressurized fluid across the conveyor to carry a crustacean leg supported on the conveyor into engagement with the meat extraction roller.

Item 14: The apparatus of any one of items 11-13, wherein:
  the meat extraction rollers have a crustacean leg inlet and define a downstream direction; and
  the apparatus further comprises a suction conduit having an inlet end positioned upstream of the meat extraction rollers proximate the crustacean leg inlet, wherein the suction conduit is connectable with a suction source and is sized to receive crustacean leg meat.

Item 15: The apparatus of any one of items 11-13, wherein:
  the meat extraction rollers have an inlet path extending downstream to the meat extraction rollers; and
  the apparatus further comprises a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 16: The apparatus of item 11, further comprising:
  first and second brush rollers, each brush roller positioned to extend into the leg slots of a respective one of the crustacean leg regions.

Item 17: The apparatus of item 16, further comprising:
  a retaining wall overlaying the conveyor downstream of the first and second brush rollers.

Item 18: The apparatus of item 11, further comprising:
  at least one ejection conveyor have conveyor projections, the ejection conveyor when operated moving the conveyor projections outwardly in a cross-machine direction along the leg slots towards at least one pair of the leg meat extraction rollers.

Item 19: The apparatus of item 11, further comprising:
  at least one spray nozzle positioned and oriented to spray a fluid jet between the conveyor and one of the meat extraction rollers in a direction transverse to a downstream direction of the one pair of the meat extraction rollers.

Item 20: The apparatus of item 19, wherein:
  the spray nozzle is oriented to spray the fluid jet downwardly, and the downstream direction is substantially horizontal.

Item 21: A method of removing meat from crustacean legs, the method comprising:
  conveying a crustacean leg on a conveyor in a machine direction; and
  directing a flow of pressurized fluid in a cross-machine direction against the crustacean leg to move the crustacean leg outwardly in the cross-machine direction into engagement with meat extraction rollers.

Item 22: The method of item 21, wherein:
  directing the flow of pressurized fluid comprises directing pressurized gas.

Item 23: The method of item 21, wherein:
  directing the flow of pressurized fluid comprises directing pressurized liquid.

Item 24: The method of any one of items 21-23, further comprising:
  moving the crustacean leg through a funnel into engagement with the meat extraction rollers.

Item 25: The method of any one of items 21-24, further comprising:
  drawing a shell of the crustacean leg through the meat extraction rollers; and
  applying vacuum suction to leg meat of the crustacean leg to resist movement of the leg meat through the meat extraction rollers with the shell.

Item 26: The method of any one of items 21-23, further comprising:
  drawing a shell of the crustacean leg through the meat extraction rollers; and
  grasping leg meat of the crustacean leg upstream of the meat extraction rollers using a mechanical gripper to resist movement of the leg meat through the meat extraction rollers with the shell.

Item 27: An apparatus for removing meat from crustacean legs, the apparatus comprising:
  a conveyor sized to support a plurality of crustacean legs;
  a meat extraction roller positioned laterally outwardly of the conveyor; and
  a fluid nozzle positioned and oriented to direct a flow of pressurized fluid across the conveyor to carry a crustacean leg supported on the conveyor into engagement with the meat extraction roller.

Item 28: The apparatus of item 27, wherein:
  the meat extraction rollers have a crustacean leg inlet and defining a downstream direction; and
  the apparatus further comprises a suction conduit having an inlet end positioned upstream of the meat extraction rollers proximate the crustacean leg inlet, wherein the suction conduit is connectable with a suction source and is sized to receive crustacean leg meat.

Item 29: The apparatus of any one of items 27-28, wherein:
  the meat extraction rollers have an inlet path extending downstream to the meat extraction rollers; and
  the apparatus further comprises a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 30: A method of removing meat from crustacean legs, the method comprising:
  moving a crustacean leg into engagement with meat extraction rollers, the crustacean leg including leg meat and a shell;
  drawing the shell through the meat extraction rollers; and
  applying vacuum suction to the leg meat to resist movement of the leg meat through the meat extraction rollers with the shell.

Item 31: The method of item 30, further comprising:
  grasping the leg meat upstream of the meat extraction rollers using a mechanical gripper to resist movement of the leg meat through the meat extraction rollers with the shell.

Item 32: The method of item 31, further comprising:
  after the shell is drawn through the meat extraction rollers, ceasing to grasp the leg meat whereby the vacuum suction moves the leg meat away from the meat extraction rollers.

Item 33: An apparatus for removing meat from crustacean legs, the apparatus comprising:
  meat extraction rollers having a crustacean leg inlet and defining a downstream direction; and
  a suction conduit having an inlet end positioned upstream of the meat extraction rollers proximate the crustacean leg inlet, wherein the suction conduit is connectable with a suction source and is sized to receive crustacean leg meat.

Item 34: The apparatus of item 33, further comprising:
  a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 35: A method of removing meat from crustacean legs, the method comprising:
  moving a crustacean leg into engagement with meat extraction rollers, the crustacean leg including leg meat and a shell;
  drawing the shell through the meat extraction rollers; and
  grasping the leg meat upstream of the meat extraction rollers using a mechanical gripper to resist movement of the leg meat through the meat extraction rollers with the shell.

Item 36: The method of item 35, further comprising:
  detecting the crustacean leg moving towards engagement with the meat extraction rollers,
  wherein said grasping is performed in response to said detecting.

Item 37: An apparatus for removing meat from crustacean legs, the apparatus comprising:
  meat extraction rollers having an inlet path extending downstream to the meat extraction rollers; and
  a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 38: The apparatus of item 37, further comprising:
  a sensor positioned and oriented to detecting when a crustacean leg is moved towards engagement with the meat extraction rollers.

Item 39: The apparatus of item 38, wherein:
  the mechanical gripper is configured to move to the gripping position in response to the sensor detecting that the crustacean leg has moved towards engagement with the meat extraction rollers.

Item 40: A method of processing crustacean legs, the method comprising:
  transporting a pre-cooked crustacean on a conveyor, the crustacean having a plurality of crustacean legs extending from a crustacean body, the conveyor carrying the crustacean in a machine direction and the conveyor having a plurality of leg slots extending in a cross-machine direction, the crustacean legs extending outwardly from the crustacean body at least partially into the legs slots; and
  brushing the crustacean legs, with at least one brush roller, away from the crustacean body to straighten the crustacean legs into the leg slots.

Item 41: The method of item 40, wherein:
  said brushing comprises the brush roller applying forces to the crustacean legs downwardly and outwardly away from the crustacean body.

Item 42: The method of item 40, wherein:
  the plurality of crustacean legs includes first crustacean legs extending in a first lateral direction from the crustacean body, and second crustacean legs extending in a second lateral direction from the crustacean body,
  the at least one brush roller comprises a first brush roller and a second brush roller, and
  said brushing comprises brushing the first crustacean legs with the first brush roller away from the crustacean body to straighten the first crustacean legs into the leg slots, and brushing the second crustacean legs with the second brush roller away from the crustacean body to straighten the second crustacean legs into the leg slots.

Item 43: The method of item 42, wherein:
said brushing comprises rotating the first brush roller and the second brush roller in opposite directions.

Item 44: The method of any one of items 40-42, further comprising:
after said brushing, transporting the crustacean legs under a retaining wall, the retaining wall at least limiting upward curling of the crustacean legs out of the leg slots.

Item 45: The method of item 44, wherein:
the retaining wall extends parallel to the machine direction.

Item 46: The method of any one of items 40-45, further comprising:
moving the crustacean legs along the leg slots into meat extraction rollers.

Item 47: The method of item 46, wherein:
said moving the crustacean legs along the leg slots comprises applying forces to the crustacean legs in the cross-machine direction with an ejection conveyor.

Item 48: The method of item 47, wherein:
said applying forces with the ejection conveyor comprises sweeping ejection conveyor projections along the leg slots in the cross-machine direction.

Item 49: The method of any one of items 46-48, wherein:
said moving the crustacean legs into the meat extraction rollers comprises passing crustacean leg shells downstream through the meat extraction rollers and extracting crustacean leg meat from the crustacean leg shells upstream of the meat extraction rollers.

Item 50: The method of item 49, further comprising:
deflecting the extracting crustacean leg transverse to a downstream direction through the meat extraction rollers using one or more fluid jets.

Item 51: An apparatus for processing crustacean legs, the apparatus comprising:
a conveyor having a crustacean body region flanked by laterally opposed crustacean leg regions, each crustacean leg region including a plurality of leg slots extending laterally outwardly of the crustacean body region; and
first and second brush rollers, each brush roller positioned to extend into the leg slots of a respective one of the crustacean leg regions.

Item 52: The apparatus of item 51, wherein:
the first and second brush rollers are positioned and oriented to brush the leg slots outwardly in a cross-machine direction when rotated.

Item 53: The apparatus of any one of items 51-52, further comprising:
a retaining wall overlaying the conveyor downstream of the first and second brush rollers.

Item 54: The apparatus of item 53, wherein:
the conveyor has a machine direction, and the retaining wall extends parallel to the machine direction.

Item 55: The apparatus of any one of items 51-54, further comprising:
a plurality of leg meat extraction rollers, each leg meat extraction roller positioned laterally outwardly of the leg slots and oriented to receive crustacean legs moved laterally outwardly from the leg slots.

Item 56: The apparatus of item 55, further comprising:
at least one ejection conveyor have conveyor projections, the ejection conveyor when operated moving the conveyor projections outwardly in a cross-machine direction along the leg slots towards at least one pair of the leg meat extraction rollers.

Item 57: The apparatus of any one of items 55-56, further comprising:
at least one spray nozzle positioned and oriented to spray a fluid jet between the conveyor and one of the meat extraction rollers in a direction transverse to a downstream direction of the one pair of the meat extraction rollers.

Item 58: The apparatus of item 57, wherein:
the spray nozzle is oriented to spray the fluid jet downwardly, and the downstream direction is substantially horizontal.

Item 59: A method of removing meat from crustacean legs, the method comprising:
placing a plurality of crustacean legs into leg slots of a conveyor, each leg slot extending in a cross-machine direction;
conveying the plurality of crustacean legs on the conveyor in a machine direction; and
moving the plurality of crustacean legs along the legs slots into meat extraction rollers.

Item 60: The method of item 59, wherein:
said placing the plurality of crustacean legs into the leg slots comprises receiving the plurality of crustacean legs between laterally extending upstanding walls that are spaced apart in the machine direction to define the leg slots.

Item 61: The method of item 59, wherein:
said moving the plurality of crustacean legs along the leg slots into meat extraction rollers comprises directing a flow of pressurized fluid laterally against the plurality of crustacean legs to move the plurality of crustacean legs laterally outwardly into engagement with the meat extraction rollers.

Item 62: The method of item 59, further comprising:
drawing shells of the plurality of crustacean legs through the meat extraction rollers; and
applying vacuum suction to leg meat of the plurality of crustacean legs to resist movement of the leg meat through the meat extraction rollers with the shells.

Item 63: The method of item 59, further comprising:
drawing shells of the plurality of crustacean legs through the meat extraction rollers; and
grasping leg meat of the plurality of crustacean legs upstream of the meat extraction rollers using a mechanical gripper, to resist movement of the leg meat through the meat extraction rollers with the shell.

Item 64: The method of item 59, further comprising:
drawing shells of the plurality of crustacean legs through the meat extraction rollers; and
spraying a fluid jet at leg meat extracting from the plurality of crustacean legs, the fluid jets oriented in a direction transverse to a downstream direction through the meat extraction rollers, to resist movement of the leg meat through the meat extraction rollers with the shell.

Item 65: The method of item 59, wherein:
said moving the plurality of crustacean legs along the leg slots comprises applying forces to the plurality of crustacean legs in the cross-machine direction with an ejection conveyor.

Item 66: An apparatus for removing meat from crustacean legs, the apparatus comprising:
a conveyor having a plurality of leg slots arranged in a machine direction, each leg slot extending laterally in a cross-machine direction; and
a plurality of leg meat extraction rollers positioned adjacent the conveyor laterally outwardly of the leg slots and oriented to receive crustacean legs moved laterally outwardly from the leg slots.

Item 67: The apparatus of item 66, wherein:
the conveyor comprises a plurality of laterally extending upstanding walls that are spaced apart in the machine direction to define the leg slots.

Item 68: The apparatus of item 66, further comprising:
a fluid nozzle positioned and oriented to direct a flow of pressurized fluid laterally across the conveyor to carry a crustacean leg supported on the conveyor into engagement with the meat extraction roller.

Item 69: The apparatus of item 66, wherein:
the meat extraction rollers have a crustacean leg inlet and define a downstream direction; and
the apparatus further comprises a suction conduit having an inlet end positioned upstream of the meat extraction rollers proximate the crustacean leg inlet, wherein the suction conduit is connectable with a suction source and is sized to receive crustacean leg meat.

Item 70: The apparatus of item 66, wherein:
the meat extraction rollers have an inlet path extending downstream to the meat extraction rollers; and
the apparatus further comprises a mechanical gripper located upstream of the meat extraction rollers, the mechanical gripper having at least two fingers, and being movable from an open position in which the fingers flank the inlet path, and a gripping position in which the fingers collectively grasp at the inlet path.

Item 71: The apparatus of item 66, further comprising:
at least one ejection conveyor having conveyor projections, the ejection conveyor when operated moving the conveyor projections outwardly in a cross-machine direction along the leg slots towards at least one pair of the leg meat extraction rollers.

Item 72: The apparatus of item 66, further comprising:
at least one spray nozzle positioned and oriented to spray a fluid jet between the conveyor and one pair of the meat extraction rollers in a direction transverse to a downstream direction of the one pair of the meat extraction rollers.

Item 73: The apparatus of item 72, wherein:
the spray nozzle is oriented to spray the fluid jet downwardly, and the downstream direction is substantially horizontal.

Item 74: An apparatus for crustacean processing, the apparatus comprising:
a conveyor including first and second belts that travel in a machine direction,
each of the first and second belts having an inner lateral belt end, an outer lateral belt end, and a lateral belt width in a cross-machine direction from the inner lateral belt end to the outer lateral belt end,
the first belt spaced apart from the second belt in the cross-machine direction, whereby the inner lateral belt ends of the first and second belts are spaced apart,
at least one of (i) the first belt being biased in the cross-machine direction towards the second belt, and (ii) the second belt being biased in the cross-machine direction towards the first belt, and
each of the first and second belts including a plurality of upstanding placement guides.

Item 75: The apparatus of item 74, wherein:
the first and second belts are biased in the cross-machine direction towards each other.

Item 76: The apparatus of item 74, wherein:
the plurality of placement guides of the first belt includes a placement guide that has an inner lateral guide end, at least a portion of the inner lateral guide end extending non-perpendicularly to the cross-machine direction.

Item 77: The apparatus of item 76, wherein:
at least the portion of the inner lateral guide end is concave.

Item 78: The apparatus of item 76, wherein:
the placement guide has an upper guide end, and
at least the portion of the inner lateral guide end is angled away from the upper guide end.

Item 79: The apparatus of item 74, wherein:
the plurality of placement guides of the first belt includes a first placement guide spaced apart from a second placement guide in the cross-machine direction.

Item 80: The apparatus of item 74, wherein:
the plurality of placement guides of the first belt includes first and second placement guides positioned adjacent to each other in the machine direction,
each of the first and second placement guides includes an inner lateral guide end, and
the inner lateral guide end of the first placement guide is offset in the cross-machine direction as compared to the inner lateral guide end of the second placement guide.

Item 81: The apparatus of item 74, wherein:
a blade gap is located between the first and second belts.

Item 82: The apparatus of item 81, further comprising:
a cutting blade that is one of (i) extending through the blade gap, or (ii) movable to a position where the cutting blade extends through the blade gap.

The invention claimed is:

1. A method of removing meat from crustacean legs, the method comprising:
placing a plurality of crustacean legs into leg slots of a conveyor, each leg slot extending in a cross-machine direction;
conveying the plurality of crustacean legs on the conveyor in a machine direction; and
moving the plurality of crustacean legs along the legs slots into meat extraction rollers.

2. The method of claim 1, wherein:
said placing the plurality of crustacean legs into the leg slots comprises receiving the plurality of crustacean legs between laterally extending upstanding walls that are spaced apart in the machine direction to define the leg slots.

3. The method of claim 1, wherein:
said moving the plurality of crustacean legs along the leg slots into meat extraction rollers comprises directing a flow of pressurized fluid laterally against the plurality of crustacean legs to move the plurality of crustacean legs laterally outwardly into engagement with the meat extraction rollers.

4. The method of claim 1, further comprising:
drawing shells of the plurality of crustacean legs through the meat extraction rollers; and
applying vacuum suction to leg meat of the plurality of crustacean legs to resist movement of the leg meat through the meat extraction rollers with the shells.

5. The method of claim 1, further comprising:
drawing shells of the plurality of crustacean legs through the meat extraction rollers; and
spraying a fluid jet at leg meat extracting from the plurality of crustacean legs, the fluid jets oriented in a direction transverse to a downstream direction through the meat extraction rollers, to resist movement of the leg meat through the meat extraction rollers with the shell.

6. The method of claim 1, wherein:
said moving the plurality of crustacean legs along the leg slots comprises applying forces to the plurality of crustacean legs in the cross-machine direction with an ejection conveyor.

7. An apparatus for removing meat from crustacean legs, the apparatus comprising:
a conveyor having a plurality of leg slots arranged in a machine direction, each leg slot extending laterally in a cross-machine direction; and
a plurality of leg meat extraction rollers positioned adjacent the conveyor laterally outwardly of the leg slots and oriented to receive crustacean legs moved laterally outwardly from the leg slots.

8. The apparatus of claim 7, wherein:
the conveyor comprises a plurality of laterally extending upstanding walls that are spaced apart in the machine direction to define the leg slots.

9. The apparatus of claim 7, further comprising:
a fluid nozzle positioned and oriented to direct a flow of pressurized fluid laterally across the conveyor to carry a crustacean leg supported on the conveyor into engagement with the meat extraction roller.

10. The apparatus of claim 7, wherein:
the meat extraction rollers have a crustacean leg inlet and define a downstream direction; and
the apparatus further comprises a suction conduit having an inlet end positioned upstream of the meat extraction rollers proximate the crustacean leg inlet, wherein the suction conduit is connectable with a suction source and is sized to receive crustacean leg meat.

11. The apparatus of claim 7, further comprising:
at least one spray nozzle positioned and oriented to spray a fluid jet between the conveyor and one pair of the meat extraction rollers in a direction transverse to a downstream direction of the one pair of the meat extraction rollers.

12. An apparatus for crustacean processing, the apparatus comprising:
a conveyor including first and second belts that travel in a machine direction,
each of the first and second belts having an inner lateral belt end, an outer lateral belt end, and a lateral belt width in a cross-machine direction from the inner lateral belt end to the outer lateral belt end,
the first belt spaced apart from the second belt in the cross-machine direction, whereby the inner lateral belt ends of the first and second belts are spaced apart,
at least one of (i) the first belt being biased in the cross-machine direction towards the second belt, and (ii) the second belt being biased in the cross-machine direction towards the first belt, and
each of the first and second belts including a plurality of upstanding placement guides.

13. The apparatus of claim 12, wherein:
the first and second belts are biased in the cross-machine direction towards each other.

14. The apparatus of claim 12, wherein:
the plurality of placement guides of the first belt includes a placement guide that has an inner lateral guide end, at least a portion of the inner lateral guide end extending non-perpendicularly to the cross-machine direction.

15. The apparatus of claim 14, wherein:
at least the portion of the inner lateral guide end is concave.

16. The apparatus of claim 14, wherein:
the placement guide has an upper guide end, and
at least the portion of the inner lateral guide end is angled away from the upper guide end.

17. The apparatus of claim 12, wherein:
the plurality of placement guides of the first belt includes a first placement guide spaced apart from a second placement guide in the cross-machine direction.

18. The apparatus of claim 12, wherein:
the plurality of placement guides of the first belt includes first and second placement guides positioned adjacent to each other in the machine direction,
each of the first and second placement guides includes an inner lateral guide end, and
the inner lateral guide end of the first placement guide is offset in the cross-machine direction as compared to the inner lateral guide end of the second placement guide.

19. The apparatus of claim 12, wherein:
a blade gap is located between the first and second belts.

20. The apparatus of claim 19, further comprising:
a cutting blade that is one of (i) extending through the blade gap, or (ii) movable to a position where the cutting blade extends through the blade gap.

* * * * *